United States Patent [19]

Wakamori et al.

[11] Patent Number: 5,065,507
[45] Date of Patent: Nov. 19, 1991

[54] METHOD FOR INSTALLING BEARINGS ON ENGINE COMPONENTS

[75] Inventors: Takehisa Wakamori, Hidaka; Takashi Ogawa, Kurume; Ryoji Ito, Kawagoe; Chikafumi Shimanaka, Sayama, all of Japan

[73] Assignee: Honda Giken Kogyo Kabushiki Kaisha, Tokyo, Japan

[21] Appl. No.: 372,610

[22] Filed: Jun. 28, 1989

Related U.S. Application Data

[62] Division of Ser. No. 915,275, Oct. 3, 1986, Pat. No. 4,872,257.

[30] Foreign Application Priority Data

| Oct. 4, 1985 | [JP] | Japan | 60-222568 |
| Oct. 7, 1985 | [JP] | Japan | 60-224204 |
| Oct. 7, 1985 | [JP] | Japan | 60-224205 |
| Oct. 9, 1985 | [JP] | Japan | 60-225831 |
| Oct. 16, 1985 | [JP] | Japan | 60-158134[U] |
| Dec. 2, 1985 | [JP] | Japan | 60-271152 |
| Dec. 2, 1985 | [JP] | Japan | 60-271153 |
| Dec. 27, 1985 | [JP] | Japan | 60-295778 |

[51] Int. Cl.$^5$ .................... B23Q 17/00
[52] U.S. Cl. .................. 29/888.01; 29/407; 29/434
[58] Field of Search .............. 29/714, 156.4 R, 430, 29/407, 469, 701, 702, 703, 705, 711, 707, 720, 721, 888.01, 888.011, 434; 901/6, 46, 47

[56] References Cited

U.S. PATENT DOCUMENTS

| 4,374,451 | 2/1983 | Miller | 29/430 |
| 4,377,890 | 3/1983 | Miller | |
| 4,628,464 | 12/1986 | McConnell | 29/721 X |

Primary Examiner—Joseph M. Gorski

[57] ABSTRACT

A bearing is automatically installed on an engine component of a internal combustion engine, such as a connecting rod, a crankshaft, a cylinder block, or the like. Data indicated on the engine component and identifying the engine component is read and stored. A bearing which matches the engine component is selected from a bearing stocker based on the stored data. The selected bearing is then transferred to an installing robot which installs the bearing on the engine component.

6 Claims, 32 Drawing Sheets

METHOD FOR INSTALLING BEARINGS ON ENGINE COMPONENTS

This application is a divisional of copending application Ser. No. 06/915,275 filed on Oct. 3, 1986 and now U.S. Pat. No. 4,872,257.

BACKGROUND OF THE INVENTION

The present invention relates to a method of and an apparatus for installing bearings on engine components, and more particularly to a method of and an apparatus for automatically selecting and installing semicylindrical bearings between connecting rods and a crankshaft and between a cylinder block and the crankshaft without manual intervention while an internal combustion engine is being assembled.

In internal combustion engines for automobiles or the like, the linear reciprocating motion of pistons which is repeated at high speeds is converted via connecting rods to the rotational motion of a crankshaft. Highly wear-resistant bearing are fitted between the connecting rods and the crankshaft and also between the crankshaft and the cylinder block in which pistons are reciprocably fitted to prevent these relatively moving engine components from being worn.

It is practically impossible to eliminate the dimensional errors of these engine components which are produced when the engine components are machined. To meet such dimensional errors, a plurality of bearing types that are dimensionally different by a few micrometers are available so that proper bearings which match the machining accuracy of a particular engine component can be selected and installed.

Each of the engine components on which bearings are to be mounted is measured for dimensions after it has been machined, and the dimensional data items are noted at a suitable location. For installing bearings on an engine component, the worker reads the noted dimensional data of the engine component, and bearings that match the dimensional data are selected and mounted.

However, the bearings that can be installed on engine components are available in quite many types which are dimensionally different. Since bearings are required to be installed on an engine component at many locations thereon, it is highly laborious for the worker to select and install appropriate bearings. Such an assembling procedure is also tedious. Inasmuch as the available bearing types are different by only slight dimensional variations, typically a few micrometers, the worker is more liable to cause installing errors as he is subjected to more fatigue. If any wrong bearings are installed on an engine component, such bearings will suffer from seizure, often causing abnormal heating while the engine is in operation.

SUMMARY OF THE INVENTION

In view of the aforesaid drawbacks of the conventional practice, it is an object of the present invention to provide a method of and an apparatus for automatically and efficiently installing semicylindrical bearings on engine components without causing any installing errors.

According to the present invention, there is provided a method of installing a bearing on an engine component of a internal combustion engine, comprising the steps of: reading data indicated on the engine component and identifying the engine component; storing the read data; selecting a bearing from a stocker which matches the engine component based on the stored data; and feeding the selected bearing to install the same on the engine component.

According to the present invention, there is also provided a method of selecting a bearing which matches an engine component by reading data marked on the engine component and installing the bearing on the engine component, the data being in the form of bar code marks, comprising the steps: of providing the bar code marks on the engine component at intervals dependent on the number of the bar code marks; measuring a time interval required from the time to start to read the bar code marks until the first bar code mark is read and/or a time interval required until adjacent bar code marks are read; determining whether the number of the bar code marks is correctly read by comparing the time interval with a reference time established according to the number of the bar code marks; and installing the bearing selected on the basis of the read bar code marks on the engine component.

According to the present invention, there is also provided a method of installing a bearing on an engine component, comprising the steps of: providing a gripper mechanism displaceable with respect to the bearing; imaging the bearing with a visual sensor disposed in a preset positional relation to the gripper mechanism; determining the position of the bearing with respect to a prescribed point in an imaging area of the visual sensor; correcting the position of the gripper mechanism with respect to the bearing based on the determined position; thereafter actuating the gripper mechanism to grip the bearing; and installing the bearing gripped by the gripper mechanism on the engine component.

According to the present invention, there is further provided an apparatus for installing a bearing on an engine component of a internal combustion engine, comprising: data readout means for reading data marked on the engine component; bearing selecting means for selecting a bearing based on the data read by the data readout means and changing the attitude of the bearing to place the bearing on positioning means; and bearing installing means for installing the bearing placed on the positioning means on the engine component.

According to the present invention, there is further provided an apparatus for installing a bearing on an engine component of a internal combustion engine, comprising: data readout means for reading data marked on the engine component, the data readout means comprising a movable swing drive mechanism having a swing shaft and a beam sensor mounted on the swing shaft for emitting a light beam toward the engine component at an angle to the axis of the swing shaft.

According to the present invention, there is also provided an apparatus for installing a bearing on an engine component of a internal combustion engine, comprising: gripper means for gripping at least one bearing; drive means for selectively actuating the gripper means; and presser means for pressing and holding a workpiece adjacent to the bearing to be gripped by the gripper means, the arrangement being such that the drive means is operated to enable the gripper means to grip the bearing and transfer the bearing to the engine component.

According to the present invention, there is also provided an apparatus for installing a bearing on an engine component of a internal combustion engine, comprising: gripper means for gripping a cap in fitting relation to a convex outer peripheral surface of a bearing placed on a jig device; and moving means for pressing the cap in engagement with the bearing and installing the cap in engagement with the bearing on the engine component.

According to the present invention, there is further provided an apparatus for installing a bearing on an engine component, comprising: suction means for holding the bearing placed on a jig device; tilting means for tilting the suction means which holds the bearing to meet an inclined portion of the engine component on which the bearing is to be fittingly installed; and moving means for moving and directing the suction means toward the inclined portion to cause the bearing held by the suction means to be installed on the inclined portion of the engine component.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
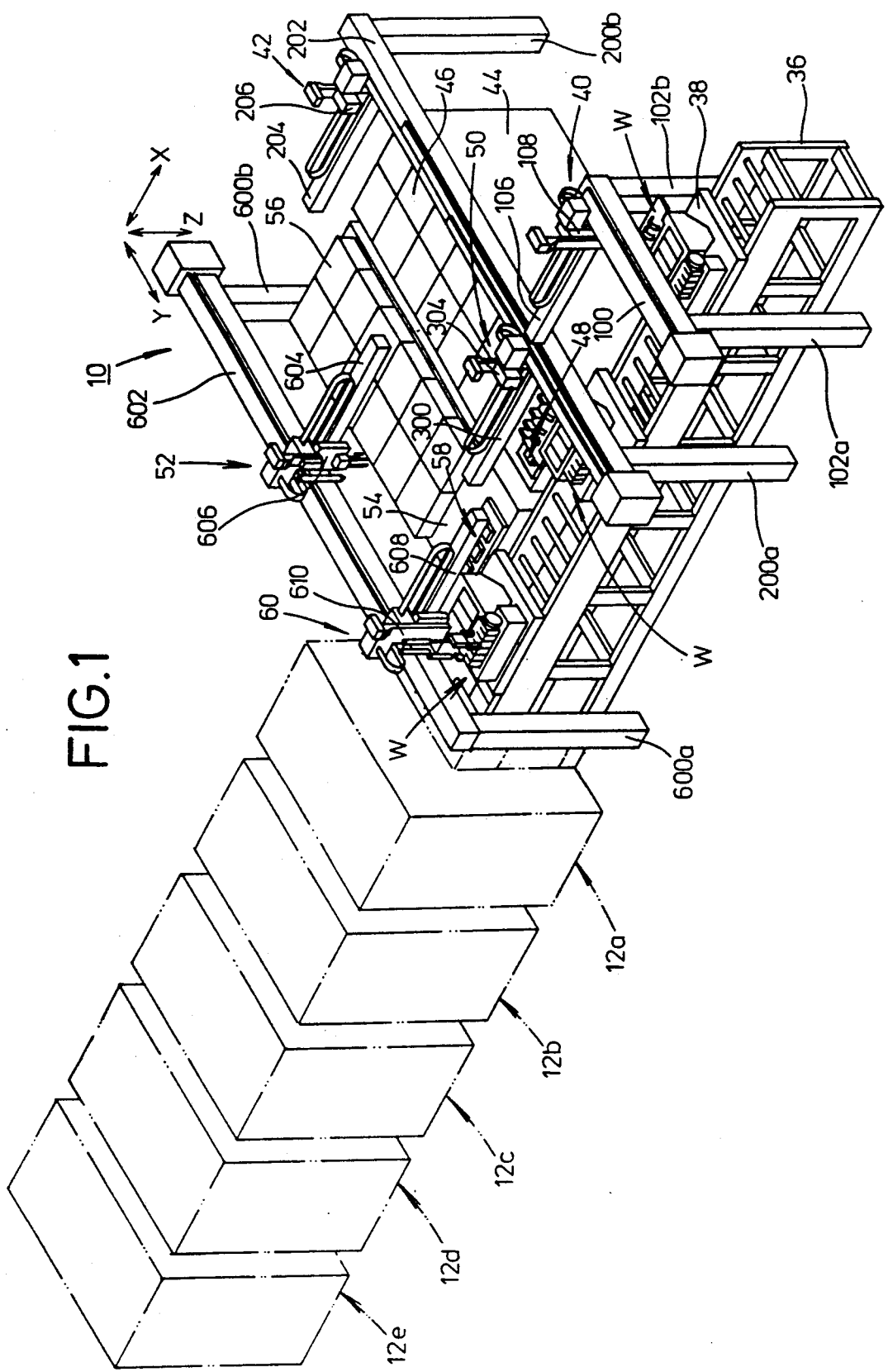
FIG. 1 is a perspective view of a production line for assembling engine components, including an installing apparatus according to the present invention.

FIG. 1 shows a production line for assembling engine components of an internal combustion engine. The production line is essentially composed of an installing apparatus 10 according to the present invention, and first through fifth installing mechanisms 12a through 12e for installing other engine components in subsequent processes than those which are installed by the installing apparatus 10.

Figure 2:
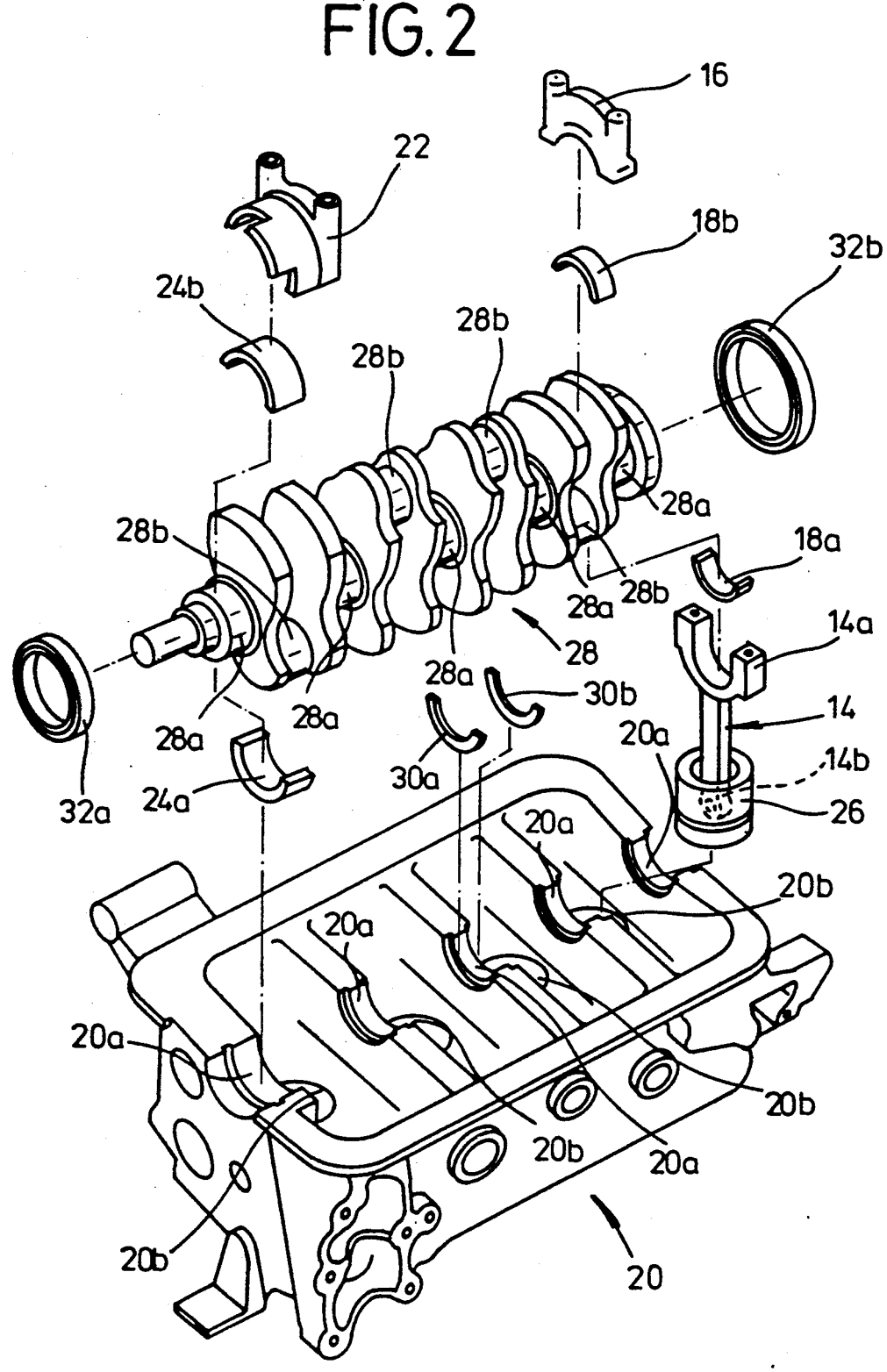
FIG. 2 is an exploded perspective view of engine components to be assembled on the production line of FIG. 1.

As shown in FIG. 2, the engine components are assembled on the production line. More specifically, the installing apparatus 10 installs connecting rod bearings 18a, 18b which are fitted in larger-diameter ends 14a of connecting rods 14 and connecting rod caps 16 to be attached to the larger-diameter ends 14a, and main bearings 24a, 24b that are fitted in journal bearing sections 20a of a cylinder block 20 and bearing caps 22 to be attached to the journal bearing sections 20a.

The connecting rod bearings 18a, 18b and the main bearings 24a, 24b are of a semicylidrical form. Although not shown, four connecting rods 14 are assembled in the cylinder block 20 with the connecting rod cap 16 attached to the larger-diameter end 14a of each of the connecting rods 14, and five bearing caps 22 are mounted on the cylinder block 20. To the smaller-diameter ends 14b of the connecting rods 14, there are coupled pistons 26 which are slidably fitted in respective cylinders 20b defined in the cylinder block 20. The linear reciprocating motion of the pistons 26 can be converted via the larger-diameter ends 14a of the connecting rods 14 to the rotation of a crankshaft 28.

In the first installing mechanism 12a, the crankshaft 28 is installed on the cylinder block 28. The crankshaft 28 has journals 28b held in slidable engagement with the respective journal bearing sections 20a of the cylinder block 20. In the second installing mechanism 12b, thrust washers 30a, 30b are inserted between opposite sides of the journal bearing sections 20a and journals 28a of the crankshaft 28. The crankshaft 28 is prevented by the thrust washers 30a, 30b from being axially displaced. The third installing mechanism 12c serves to install oil seals 32a, 32b on opposite ends of the crankshaft 28 which has been installed on the cylinder block 20. The fourth installing mechanism 12d installs the connecting rod caps 16 on the larger-diameter ends 14a of the connecting rods 14 so that they are fitted over crank pins 28b of the crankshaft 28. Finally, the fifth installing mechanism 12e installs the bearing caps 22 on the journal bearing sections 20a of the cylinder block 20 so that they are fitted over the journals 28a of the crankshaft 28.

The installing apparatus 10 and the first through fifth installing mechanisms 12a through 12e are interconnected by a roller conveyor 36 which conveys workpieces W. The workpieces W include the connecting rod caps 16, the cylinder block 20 with the connnecting rods 14 installed, the bearing caps 22, and the crankshaft 28, and are placed at prescribed locations on workpiece transfer tables 38.

Figure 3:
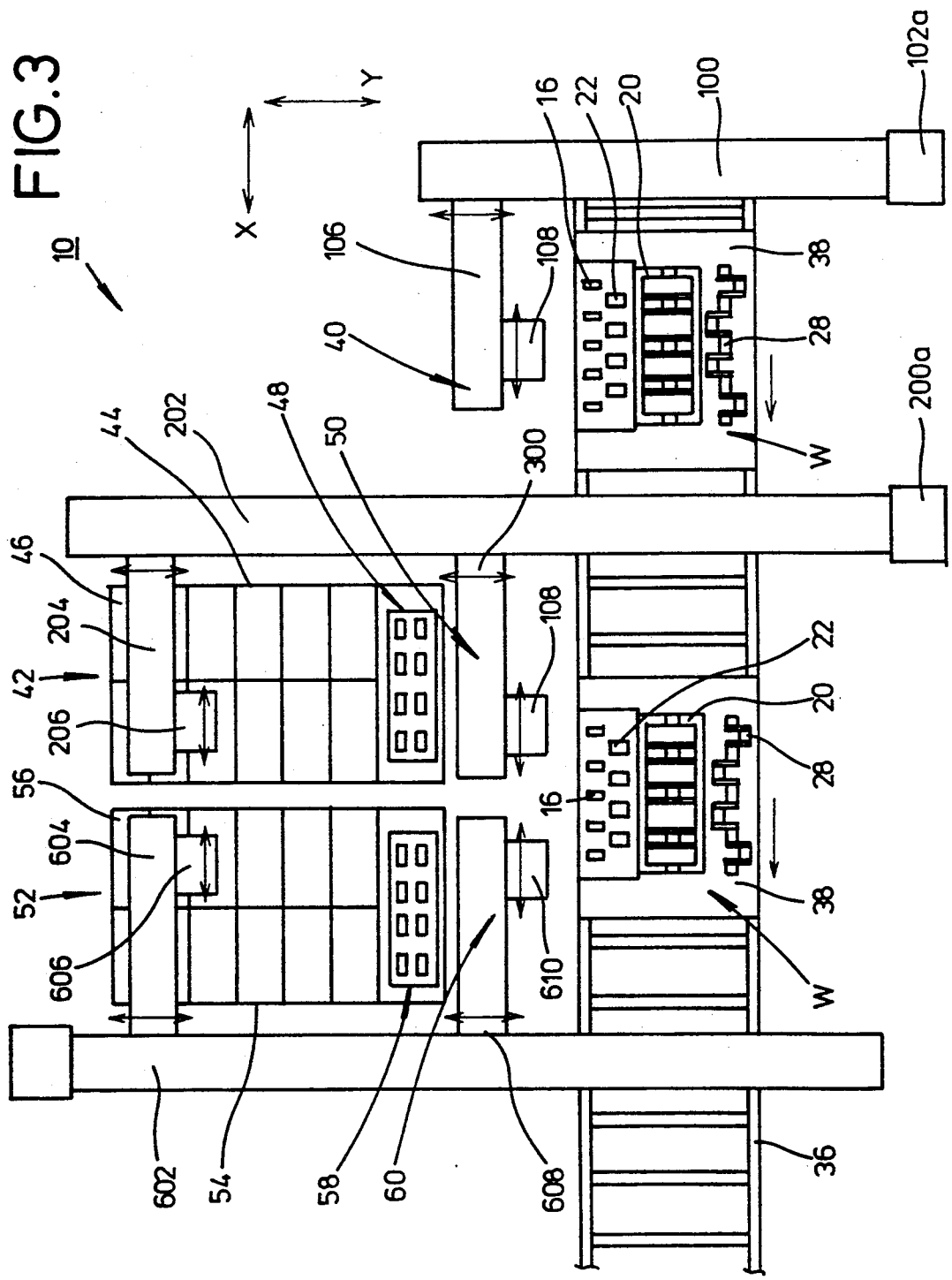
FIG. 3 is schematic plan view of the installing apparatus of the present invention.

As illustrated in FIGS. 1 and 3, the installing apparatus 10 according to the present invention comprises five robots which are operable in the Cartesian coordinate system. The first robot is a data readout robot 40 operable as data readout means for reading dimensional data of the workpieces W. The second robot is a connecting rod bearing selecting robot 42 operable as bearing selecting means for selecting the connecting rod bearings 18a, 18b based on the dimensional data read by the data readout robot 40.

A support table 44 is positioned below the working envelope of the connecting rod bearing selecting robot 42 and supports thereon a plurality of stockers or magazines 46 in which connecting rod bearings 18a, 18b classified according to their dimensions. On the support table 44, there is disposed a jig device 48 for positioning connecting rod bearings 18a, 18b that have been selected from a stocker 46 by the connecting rod bearing selecting robot 42.

The third robot is a connecting rod bearing installing robot 50 operable as connecting rod bearing installing means for installing the connecting rod bearings 18a, 18b selected by the connecting rod bearing selecting robot 42 on the larger-diameter ends 14a of the connecting rods 14 and the connecting rod caps 16. The fourth robot is a main bearing selecting robot 52 operable as main bearing selecting means for selecting main bearings 24a, 24b based on the dimensional data of the workpiece W read by the data readout robot 40. The main bearing selecting robot 42 has a working envelope below which there lies a support table 54 supporting thereon a plurality of stockers or magazines 54 in which main rod bearings 24a, 24b classified according to their dimensions. A jig device 58 is disposed on the support table 54 for positioning main rod bearings 24a, 24b that have been selected from a stocker 56 by the main bearing selecting robot 52. The fifth robot is a main bearing installing robot 60 operable as main bearing installing means for installing the main bearings 24a, 24b selected by the main bearing selecting robot 52 on the journal bearing sections 20a of the cylinder block 20 and the bearing caps 22.

Figure 4:
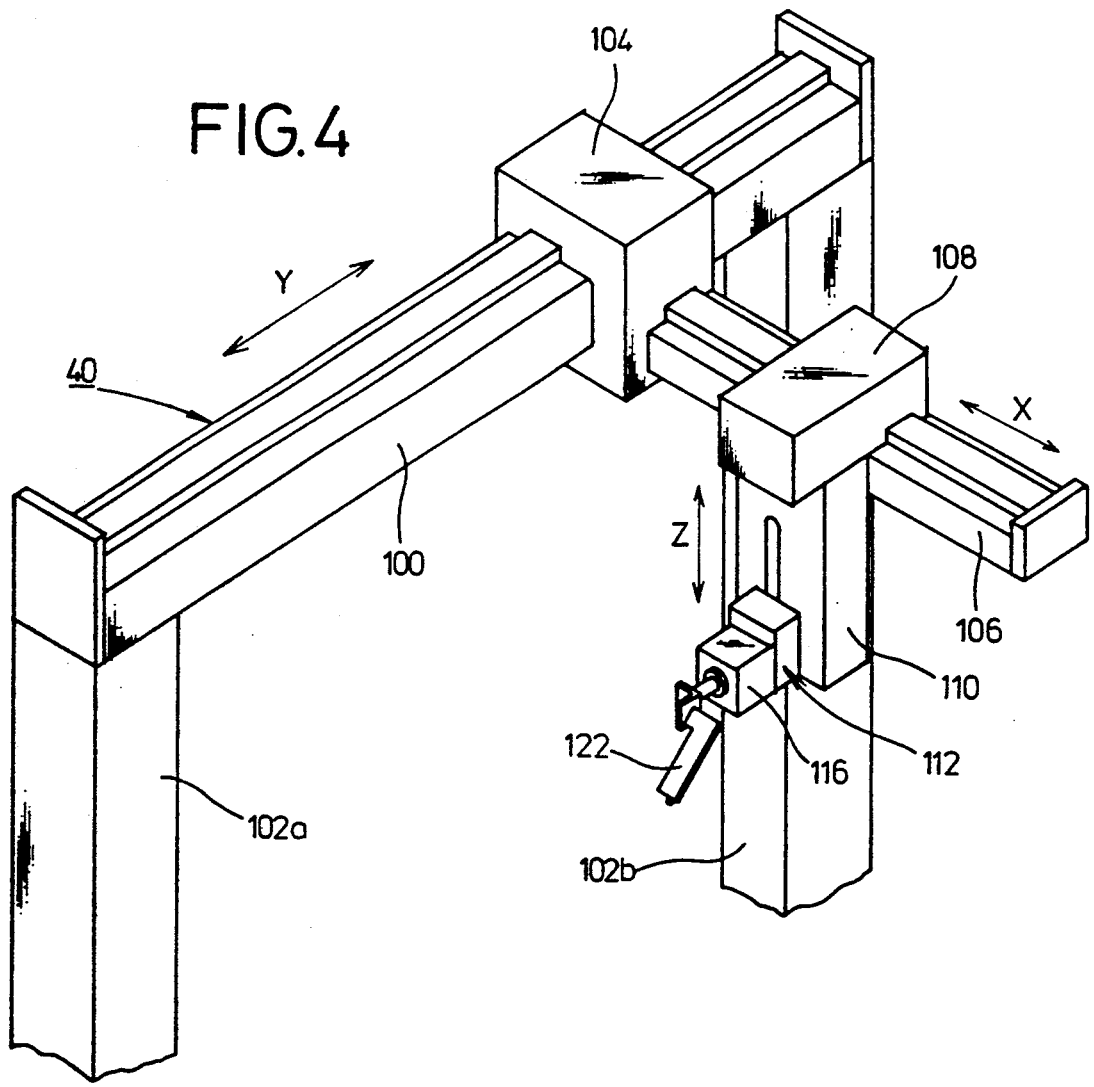
FIG. 4 is a fragmentary perspective view of a data readout robot in the installing apparatus.

The data readout robot 40 will first be described below. As described above, the data readout robot 40 is constructed as a robot operable in the Cartesian coordinate system. As illustrated in FIG. 4, the data readout robot 40 includes a Y-axis arm 100 supported on legs 102a, 102b in a given working space and extending in a Y-axis direction. A Y-axis movable unit 104 is mounted on the Y-axis arm 100 for sliding movement in the Y-axis direction. To the Y-axis movable unit 104, there is fixed an X-axis arm 106 extending in an X-axis direction and on which an X-axis movable unit 108 is mounted for sliding movement in an X-axis direction. The X-axis movable unit 108 supports a Z-axis arm 110 extending in a Z-axis direction and on which a Z-axis movable unit 112 is mounted for sliding movement in the Z-axis direction.

Since the Y-axis movable unit 104, the X-axis movable unit 108, and the Z-axis movable unit 112 are movable along the mutually perpendicular axes by drive mechanisms (not shown), the Z-axis movable unit 112 is movable in any direction in the three-dimensional space.

Figure 5:
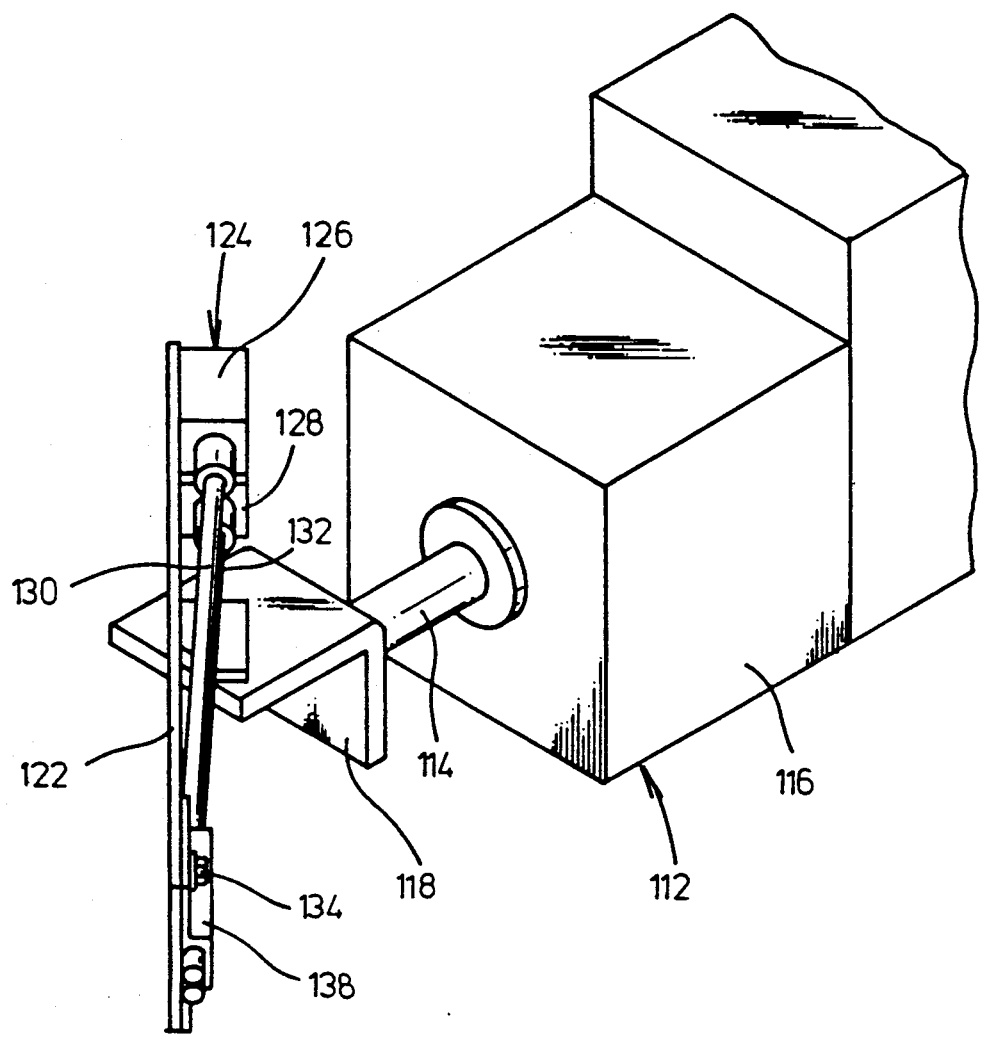
FIG. 5 is a fragmentary perspective view of a Z-axis movable unit of the data readout robot shown in FIG. 4.

As shown in FIG. 5, a swing drive mechanism 116 having a swing shaft 114 is fixed to the Z-axis movable unit 112. The swing drive mechanism 116 has a rotary actuator (not shown) housed therein with the axis of the swing shaft 114 being parallel to the Y-axis. An L-shaped attachment bracket 118 is secured to the distal end of the swing shaft 114. A support plate member 122 is fastened by bolts 120 (FIG. 6) to the attachment bracket 118. The support plate member 122 has a relatively wide plate area lying in a plane extending at an angle θ1 of 45° (FIG. 6) to the axis of the swing shaft 114.

A beam sensor 124 is mounted on the relatively wide plate area of the support plate member 122. The beam sensor 124 comprises a light-emitting element 126 connected to an optical fiber 130 and a light detector 128 connected to an optical fiber 132. The beam sensor 124 serves as an automatic optical data readout mechanism which operates by applying a light beam emitted from the light-emitting element 126 through the optical fiber 130 to an object and detecting a light beam reflected by the object through the optical fiber 132 with the light detector 128 to sense any change in the amount of the reflected light. Distal end portions of the optical fibers 130, 132 are retained by a clamp 138 fixed by bolts 134, 136 to the support plate member 122. The distal ends of the optical fibers 130, 132 are angularly arranged with respect to each other at a suitable angle such that the light beam emitted from the light-emitting element 126 via the optical fiber 130 and reflected by the object can appropriately be introduced into the optical fiber 132. The attachment bracket 118, the support plate member 122, and the clamp 138 are arranged to hold the beam sensor 124 such that the light beam emitted from the beam sensor 124 is oriented substantially at an angle of 45° with respect to the axis of the swing shaft 114.

The connecting rod bearing selecting robot 40 will then be described below. The connecting rod bearing selecting robot 40 includes an arm 202 (FIG. 1) extending in the Y-axis direction and supported at its opposite ends by legs 200a, 200b, an arm 204 extending in the X-axis direction and movable in the Y-axis direction along the arm 202, a gripper mechanism 208 (FIG. 8) movable along the arm 204 in the X-axis direction and movable in the Z-axis direction by a movable unit 206, and a workpiece tilting mechanism 210 disposed parallel to the gripper mechanism 208. The gripper mechanism 208 includes an L-shaped attachment bracket 212 supporting on one end thereof a cylinder 214 to which pipes 216a, 216b (FIG. 10) are connected for introducing and discharging a fluid under pressure into and out of the cylinder 214. A rack 218 is mounted on a piston rod (not shown) extending vertically from the cylinder 214, the rack 218 have teeth on its opposite sides. The rack 218 extends into a hand 222 secured to the cylinder 214. The hand 222 includes a pair of rotatable pinions 224, 226 held in mesh with the teeth 220a, 220b of the rack 218, and a pair of chucks 228a, 228b displaceable horizontally, the chucks 228a, 228b having on their upper surfaces teeth 230a, 230b meshing with the pinions 224, 226, respectively. The chucks 228a, 228b have attachment bars 232a, 232b, respectively, projecting downwardly therefrom. A support strip 234 secured to the attachment bar 232a includes a first L-shaped member 236a (FIGS. 8 and 9) and a second member 236b integrally formed with the first member 236a and extending horizontally from one end of the first member 236a. To the second member 236b, there is fixed a pair of rods 238a, 238b extending downwardly parallel to opposite ends of the second member 236b and to each other. The rods 238a, 238b serve as gripper means 240 and have on their lower ends fingers 242a, 242b, respectively, made of a flexible resin-based material. The first member 236a is fastened to the attachment bar 232a by a stopper bolt 244 and a bolt 246a, thus securing the support strip 234 to the hand 222. The stopper bolt 244 has a tip end spaced a distance from the attachment bar 232b, and a compression coil spring 245 is disposed around the stopper bolt 244.

Figure 8:
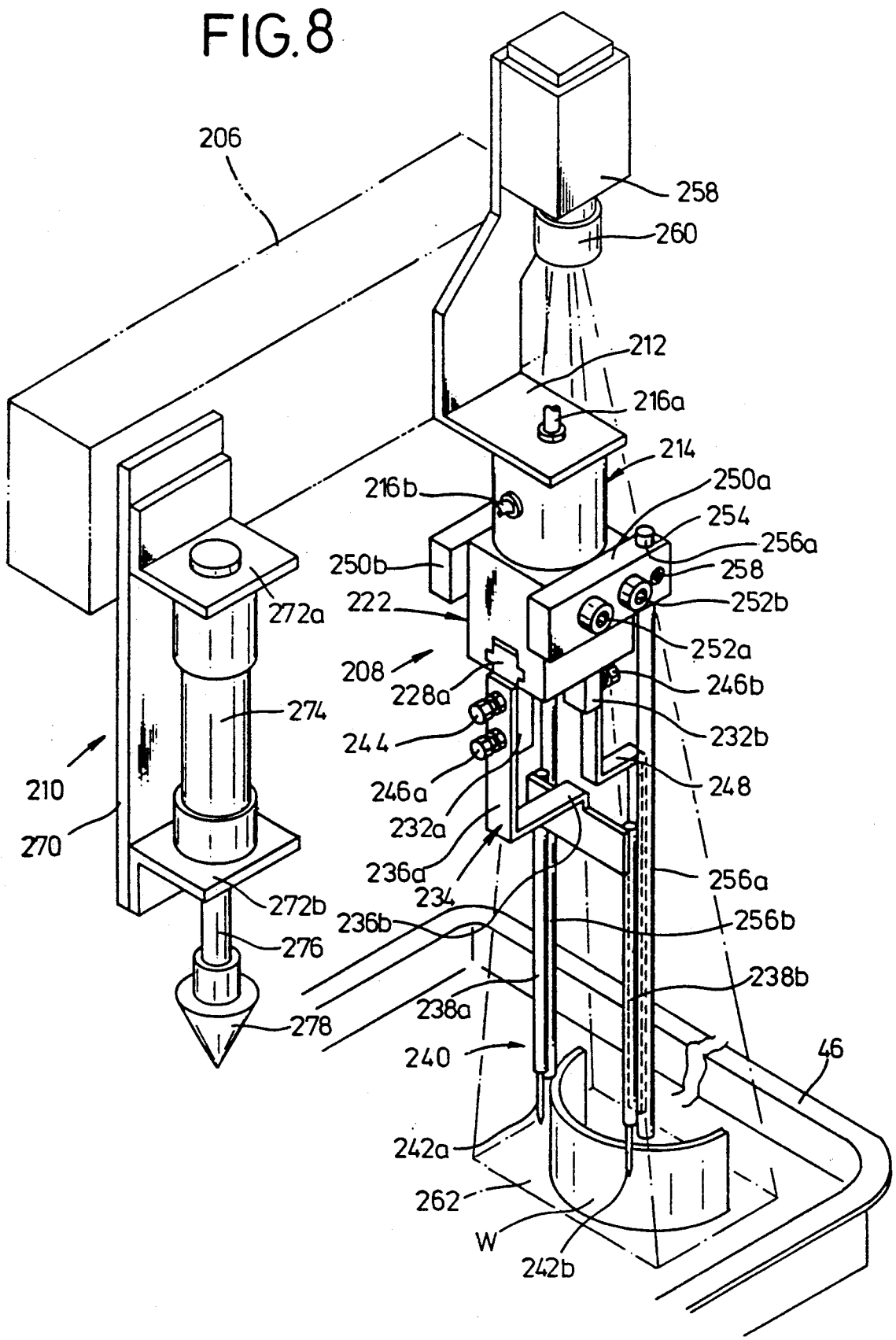
FIG. 8 is a perspective view of a connecting rod bearing selecting robot of the installing apparatus.
Figure 9:
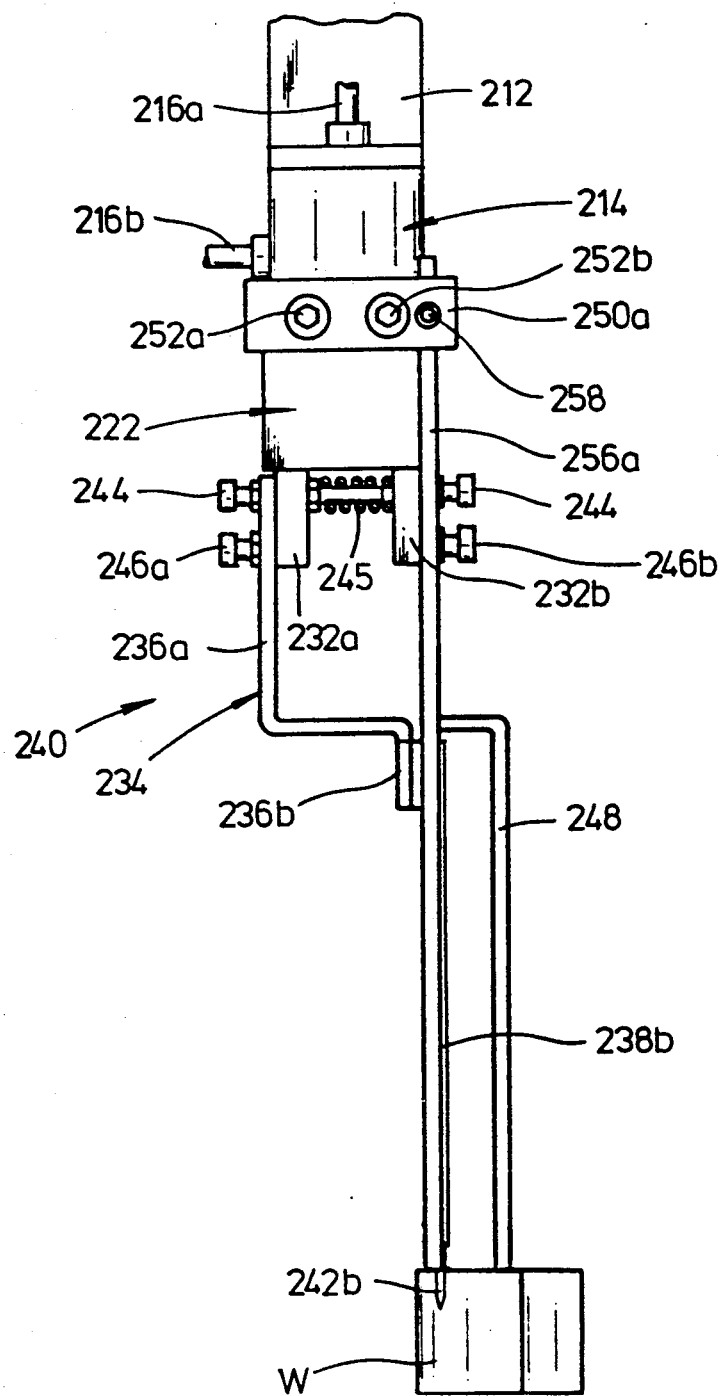
FIG. 9 is a side elevational view of a gripper mechanism of the connecting rod bearing selecting robot shown in FIG. 8.

A strip 248 is fixed by a bolt 246b to the attachment bar 232b of the chuck 228b, the strip 248 being part of the gripper means 240. The strip 248 is positioned intermediate between the rods 228a, 228b and extends downwardly parallel thereto. The strip 248 includes a horizontal portion and a vertical portion extending downwardly from the horizontal portion. Preferably, the lower end of the strip 248 and the lower ends of the fingers 242a, 242b are located at the same height level. As shown in FIG. 8, holders 250a, 250b are fixed by bolts 252a, 252b to the hand 222 on opposite sides thereof. The holders 250a, 250b have vertical holes 254 defined respectively therethrough and through which respective rod-shaped stoppers 256a, 256b extend. The stoppers 256a, 256b are fixed to the holders 250a, 250b, respectively, by setscrews 258. The lower ends of the stoppers 256a, 256b are positioned higher than the lower ends of the strip 248 and the fingers 242a, 242b.

The attachment bracket 212 has a bent upper end on which a visual sensor 260 is mounted by means of a channel-shaped attachment member 258. The visual sensor 260 may comprise a CCD (charge-coupled device) camera, for example, having an imaging area 262 including a bearing as a workpiece W and the tip end portions of the rods 238a, 238b and the strip 248. The imaging area 262 is defined within the stocker 46, which is in the form of a tray. Preferably, the inner surface of the stocker 46 is lined with a sheet of black flock paper having a relatively small reflectivity, and the workpiece W is illuminated by an LED or the like from the visual sensor 260, so that an image of the workpiece W can be formed at a high contrast.

The workpiece tilting mechanism 210 is mounted on the movable unit 206 in spaced relation to the gripper mechanism 208. The workpiece tilting mechanism 208 includes an attachment plate 270 fixed to the movable unit 206 and a cylinder 274 mounted by L-shaped brackets 272a, 272b on the attachment plate 270. The cylinder 274 has a downwardly extending piston rod 276 with a conical presser 278 fixed to a lower end thereof.

Figure 11:
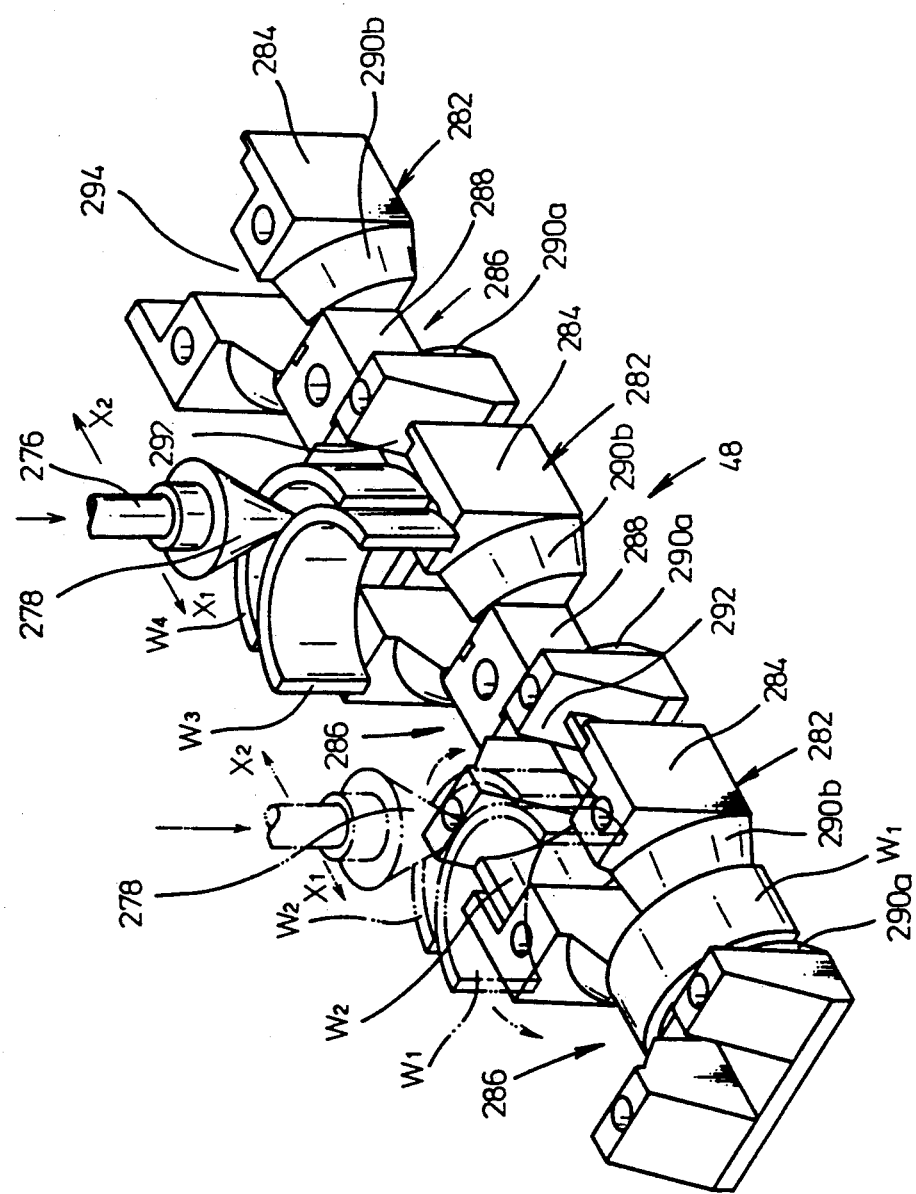
FIG. 11 is a perspective view of a workpiece tilting mechanism and a jig device of the connecting rod bearing selecting robot, the view showing the correlation between the workpiece tilting mechanism, the jig device, and the workpiece.

As shown in FIG. 11, workpieces W, i.e., semicylindrical bearings W1 through W4, are positioned by the jig device 48, which includes a plurality of successive jig bases 282. Each of the jig bases 282 has a workpiece rest 284 formed at one end thereof and having a certain height, and a first workpiece holder 286 disposed on one end of the workpiece rest 284. The first workpiece holder 286 includes a support base 288 having the same width as that of an inner portion of the each workpiece W, and positioning slanted portions 290a, 290b integrally formed with the opposite ends of the support base 288 and inclined outwardly in a direction away from each other. The jig base 282 also includes a second workpiece holder 292 defined between the other end of the workpiece rest 284 and the adjacent jig base 282. The second workpiece holder 292 has no support base, but defines a space 294 that is slightly larger than the outer periphery of the workpiece W for allowing the semicylindrical workpiece W as inverted to be fitted in the space 294. The jig device 48 is actually constructed as a succession of such first workpiece holders 286 and second workpiece holders 292 which alternate with each other.

The connecting rod bearing installing robot 50 comprises the arm 202 shared by the connecting rod bearing selecting robot 42, an arm 300 (FIG. 1) extending in the X-axis direction and movable along the arm 202 in the Y-axis direction, and a movable unit 304 (FIG. 12) movable along the arm 300 in the X-axis direction. The movable unit 304 has a first installing mechanism 306 for installing a connecting rod bearing 18a on the larger-diameter end 14a of a connecting rod 14 and a second installing mechanism 308 for installing a connecting rod bearing 18b on a connecting rod cap 16. The first and second installing mechanisms 306, 308 are mounted on a base plate 310 in spaced relation to each other.

Figure 12:
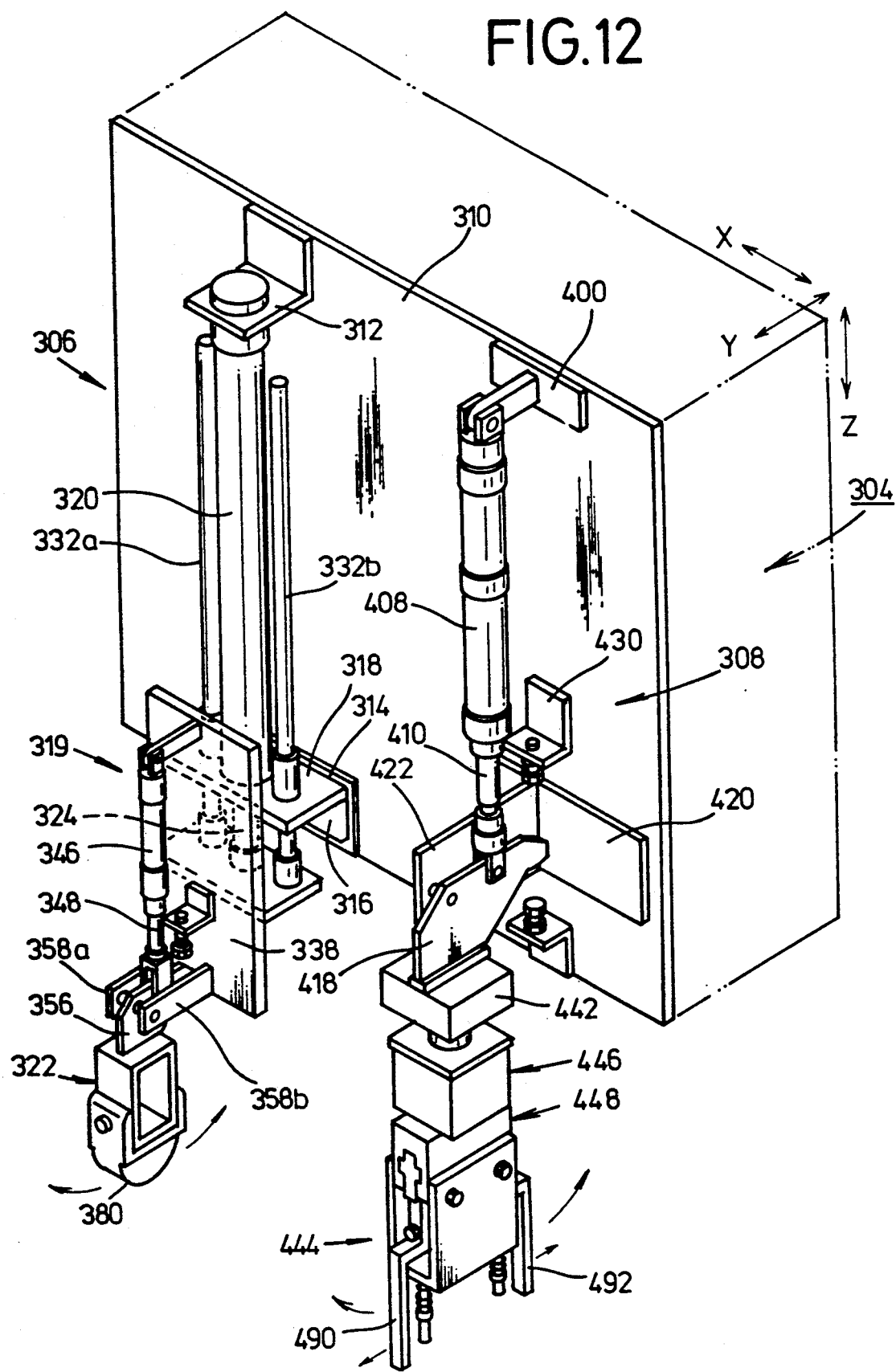
FIG. 12 is a perspective view of a connecting rod bearing installing robot of the installing apparatus.

The first installing mechanism 306 will first be described with reference to FIGS. 12 and 13. The base plate 310 is integrally disposed on one side of the movable unit 304. An L-shaped bracket 312 is fixed to an upper end of the base plate 310. A plate 314 is secured to a lower end of the base plate 310, and a support plate 316 of a substantially triangular shape is secured to one end of the plate 314. Another triangular support plate 336 (FIG. 13) is also secured t the other end of the plate 314. A cylinder 320 for moving the movable unit 304 in the Z-axis direction is secured at one end centrally to an attachment plate 318 mounted on the support plates 316, 336. The other end of the cylinder 320 is fixed to the bracket 312. The cylinder 320 and the movable unit 304 serve as actuator means for displacing a suction mechanism 322 along a prescribed path.

A piston rod 324 extending from the cylinder 320 projects downwardly beyond the attachment plate 318 and is joined to a horizontal attachment plate 328 of a vertically movable unit 319 by means of a joint 326. Cylindrical guide members 330a, 330b are mounted vertically in holes defined in the attachment plate 318 and positioned one on each side of the cylinder 320. Guide bars 332a, 332b are slidably inserted respectively through the cylinderical guide members 330a, 330b and the attachment plate 318, and have lower ends secured to the attachment plate 328 by means of joints 334a, 334b.

Figure 13:
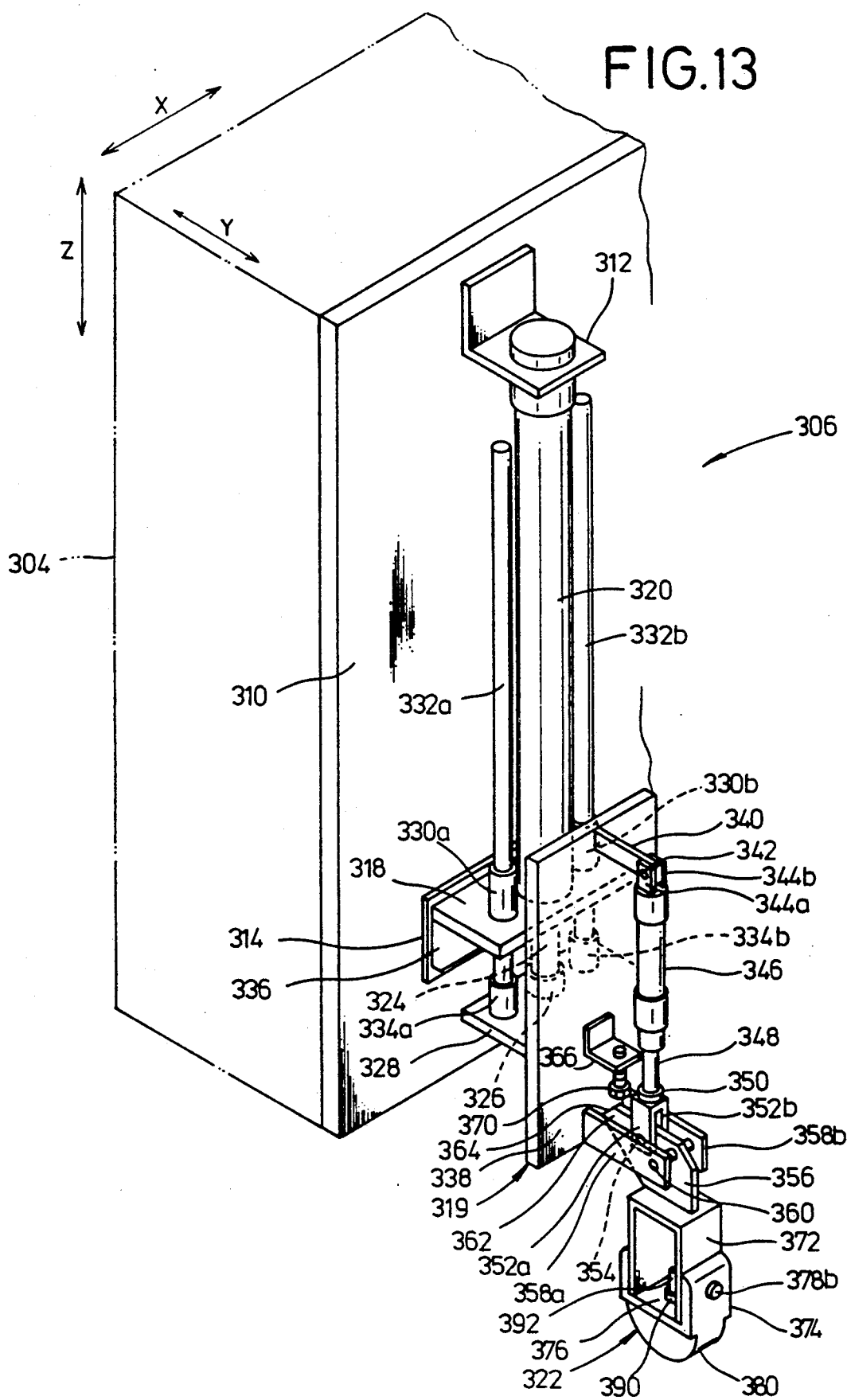
FIG. 13 is a perspective view of a first installing mechanism of the connecting rod bearing installing robot illustrated in FIG. 12.

As better shown in FIG. 13, a vertical base plate 338 is integrally attached to the attachment plate 328. A support arm 340 is secured to the upper end of the base plate 338 in perpendicular relation thereto. A tilting cylinder 346 has on its upper end two spaced plates 344a, 344b coupled to a shaft 342 mounted on the distal end of the support arm 340. The tilting cylinder 346, which serves as tilting means, is therefore angularly movable about the shaft 342. A coupling 350 is secured to the lower end of a piston rod 348 projecting downwardly from the lower end of the tilting cylinder 346. The coupling 350 has two parallel arms 352a, 352b integrally projecting downwardly and supporting a shaft 354 on which a swing plate 356 is angularly movably mounted. Two support plates 358a, 358b are fixed perpendicularly to the lower end of the base plate 338 and spaced from each other with the swing plate 356 being disposed between the support plates 358a, 358b. The swing plate 356 is angularly movably mounted by a shaft 360 on distal end portions of the support plates 358a, 358b.

The shafts 354, 360 are spaced from each other and extend parallel to each other. Consequently, when the cylinder 346 is actuated to displace the piston rod 348 axially, the swing plate 356 which is coupled by the shaft 354 and the coupling 350 to the piston rod 348 can be angularly moved about the shaft 360. The swing plate 356 has a projection 362 directed toward the base plate 338 and having a slanted surface 364. An L-shaped bracket 366 is affixed to the base plate 338 upwardly of the support plates 358a, 358b. A bolt-like stopper pin 368 with a lock nut 370 thereon is threaded vertically through a portion of the bracket 366 which extends perpendicularly to the base plate 338.

The stopper pin 368 has a head directed toward the slanted surface 364 of the swing plate 356 for adjustably limiting the area in which the swing plate 356 is angularly movable, the area being adjustable by changing the distance between the head of the stopper pin 368 and the slanted surface 364.

Figure 14:
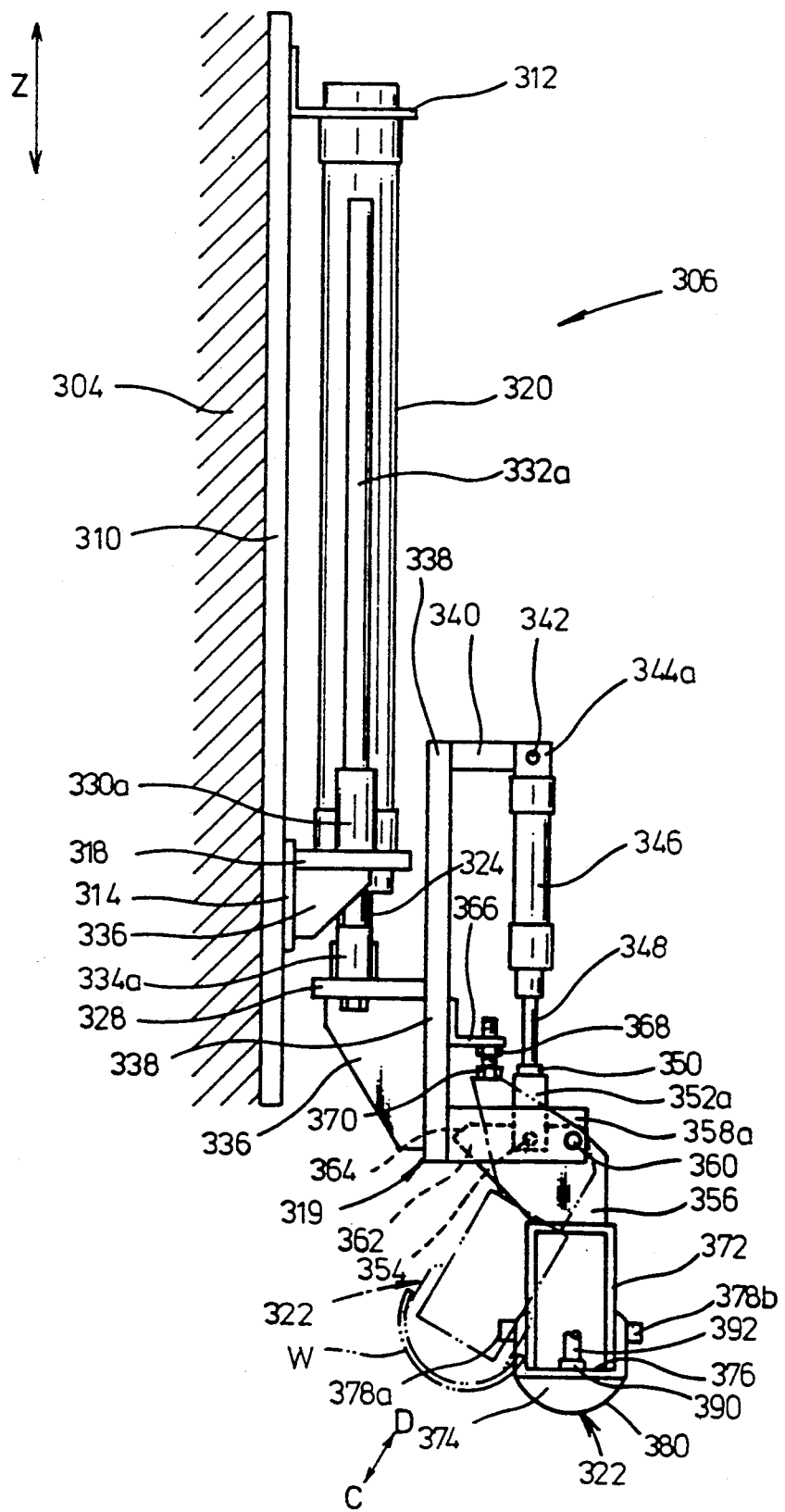
FIG. 14 is a side elevational view of the first installing mechanism of FIG. 13.
Figure 15:
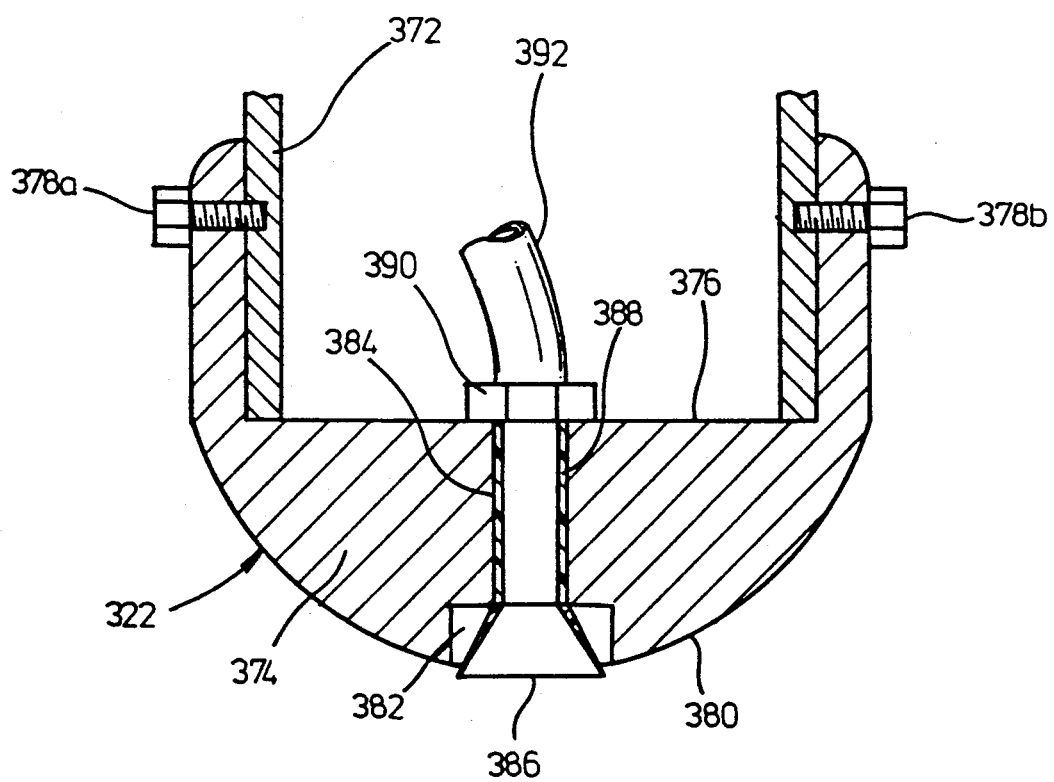
FIG. 15 is a vertical cross-sectional view of a presser having a curved-surface of the first installing mechanism shown in FIGS. 13 and 14.

A downwardly opening channel-shaped connector 372 is fixed to the lower end of the swing plate 356. The suction mechanism 322 is mounted on the connector 372. More specifically, the suction mechanism 322 comprises a presser 374 having a recess 376 in which the lower portion of the connector 372 is fitted. As shown in FIGS. 14 and 15, the presser 374 and the connector 372 are firmly interconnected by tightening bolts 378a, 378b. The presser 374 has on its lower end an arcuately curved surface 380 complementary to the inner surface of the semicylindrical connecting rod bearing 18a. A hole 382 of a relatively large diameter and a hole 384 of a relatively small diameter are successively defined in the presser 374 from the central portion of the curved surface 380 toward the central portion of the recess 376. A suction cup 386 made of a flexible material is loosely fitted as suction means in the hole 382, and connected to a tub 388 fixedly extending through the hole 384. The suction cup 386 has a flaring tip end slightly projecting beyond the curved surface 380. The upper end of the tube 388 is connected by a ring-shaped joint 390 to one end of a tube 392 with its other end connected to a vacuum pump mechanism (not shown).

Figure 16:
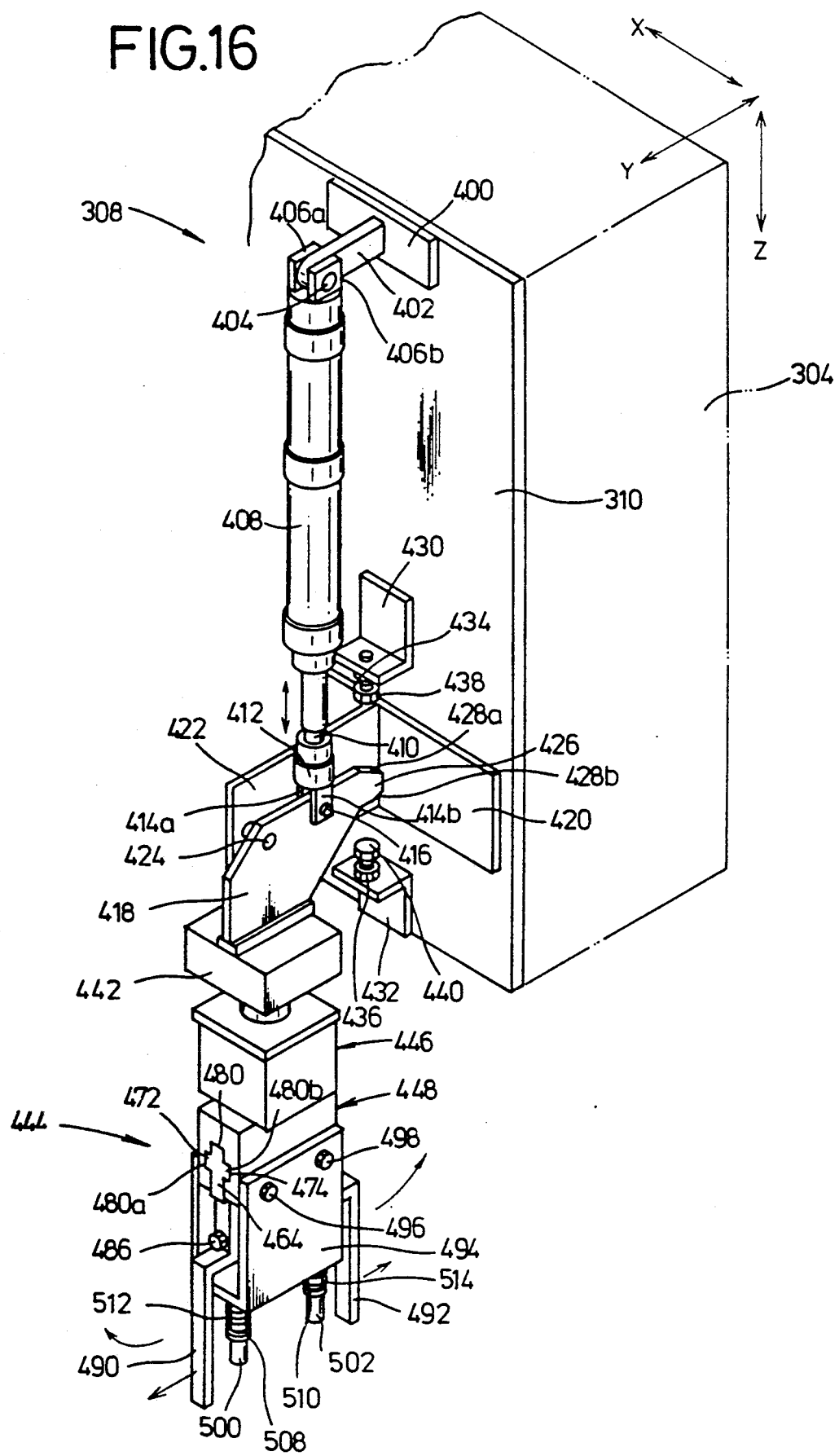
FIG. 16 is a perspective view of a second installing mechanism of the connecting rod bearing installing robot.
Figure 17:
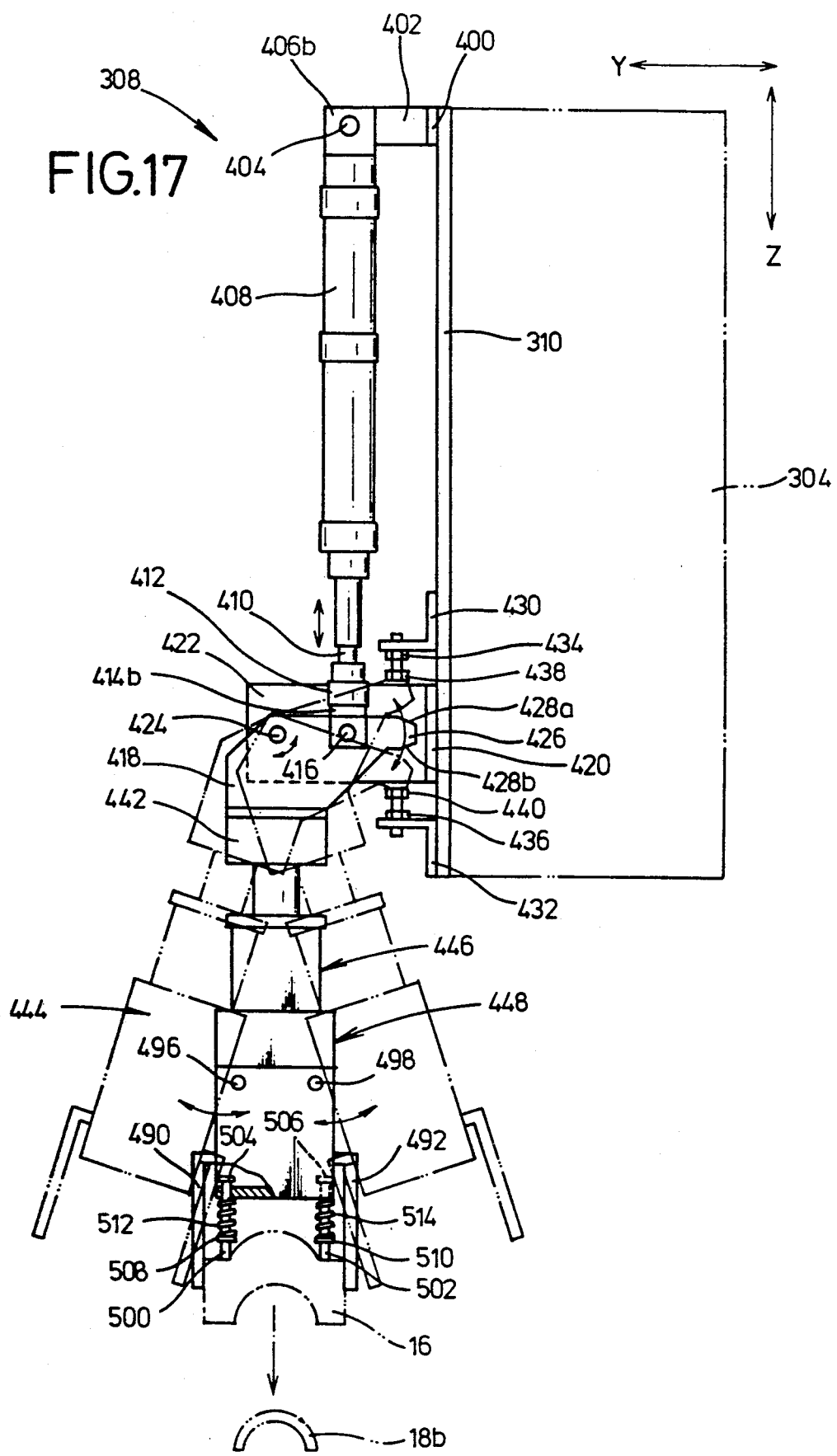
FIG. 17 is a side elevational view showing the manner in which the second installing mechanism of FIG. 16 operates.
Figure 18:
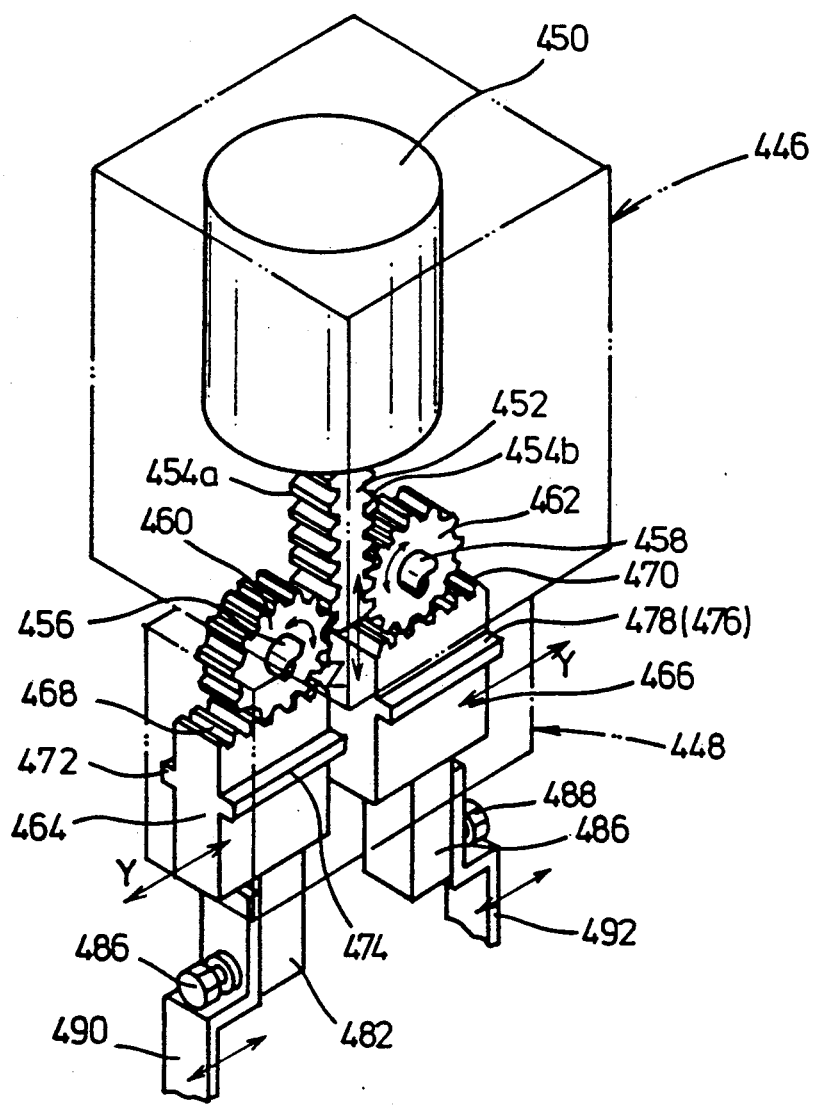
FIG. 18 is a perspective view of a chuck unit of the second installing mechanism shown in FIGS. 16 and 17.

The second installing mechanism 308 will then be described with reference to FIGS. 16 through 18. A support plate 402 lying perpendicularly to the base plate 310 has one end secured by a support plate 400 to the base plate 310. The other end of the support plate 402 is connected by a shaft 404 to two spaced arms 406a, 406b which are joined to the upper end of a cylinder 408. The cylinder 408 is thus angularly movable about the shaft 404. The cylinder 408 which extends downwardly in the Z-axis direction has a piston rod 410 projecting downwardly therefrom and joined to a coupling 412 having two parallel arms 414a, 414b directed downwardly. A swing plate 418 is angularly movably supported on a shaft 416 supported between the arms 414a, 414b. A support plate 422 is perpendicularly secured at one end thereof to the lower end of the base plate 310 by a support plate 420. The swing plate 418 is angularly movably supported by a shaft 424 fixed to the other end of the support plate 422. The shafts 416, 424 are spaced from each other in the Y-axis directionn and parallel to each other. Therefore, the swing plate 418 can be swung about the shaft 424 when the piston rod 410 coupled by the coupling 412 to the shaft 416 is vertically displaced. The swing plate 418 has one projecting end 426 projecting toward the support plate 420, with upper and lower slanted surfaces 428a, 428b defined on the projecting end 426. Substantially L-shaped brackets 430, 432 are fixed to the base plate 310 upwardly and downwardly, respectively, of the support plate 420. The brackets 430, 432 include portions normal to the base plate 310 which support upper and lower end stopper pins 438, 440 in threaded engagement therewith, with nuts 434, 436 threaded thereon, respectively. The upper and lower end stopper pins 438, 440 have heads directed toward the slanted surfaces 428a, 428b, respectively, and spaced from each other to define the limited area therebetween in which the swing plate 418 is angularly movable. The stopper pins 438, 440 are positionally adjustable by the nuts 434, 436, respectively.

The swing plate 418 has a lower end joined by a connector 442 to a hand 444 including a cylinder unit 446 fixed to the lower end of the connector 442, with a chuck actuator 448 fixed to the lower end of the cylinder unit 446. The cylinder unit 446 and the chuck actuator 448 are of a structure as shown in FIG. 18. The cylinder unit 446 includes a cylinder 450 for opening and closing a chuck, the cylinder 450 has a piston rod (not shown) connected to a rack 452 movable in the Z-axis direction upon operation of the cylinder 450. The rack 452 has teeth 454a, 454b on opposite sides thereof which extend perpendicularly to the Y-axis direction, the teeth 454a, 454b being held in mesh with respective pinions 460, 462 supported on shafts 456, 458, respectively. The pinions 460, 462 are in turn held in mesh with teeth 468, 470 of racks 464, 466 movable in the Y-axis direction and perpendicularly to the rack 452. On opposite sides of the racks 464, 466, there are formed rails 472, 474 and 476, 478 extending parallel to the Y-axis direction and projecting in the X-axis direction. The chuck actuator 448 has a groove 480 (FIG. 16) defined in the Y-axis direction and opposite guide grooves 480a, 480b on opposite sides of the groove 480. The racks 464, 466 are disposed in the groove 480, with the rails 472, 474 and 476, 478 slidably fitted respectively in the guide grooves 480a, 480b.

Two legs 482, 484 project downwardly from the lower ends of the racks 464, 466, respectively, and extend in the Z-direction. To these legs 482, 484, there are fixed the upper ends of gripper fingers 490, 492 by means of screws 486, 488, the gripper fingers 490, 492 confronting each other in spaced relation and serving as a chuck mechanism. A substantially channel-shaped support 494 is attached to the lower end of the chuck actuator 448 between the gripper fingers 490, 492, the support 494 having opposite legs fastened by bolts 496, 498 to the chuck actuator 448. Two positioning pins 500, 502 which are axially movable are fitted in holes defined in the lower end of the support 494 adjacent to the gripper fingers 490, 492. As shown in FIG. 17, the positioning pins 500, 502 have upper ends projecting upwardly into the support 494, and flanged screws 504, 506 are attached to the projecting upper ends of the positioning pins 500, 502 for preventing the latter from being detached from the support 494. The positioning pins 500, 502 have flanges 508, 510 on their lower ends, respectively. Compression coil springs 512, 514 are disposed around the positioning pins 500, 502 between the lower end of the support 494 and the flanges 508, 510, respectively, for normally urging the positioning pins 500, 502 to move downwardly in the Z-axis direction.

As shown in FIG. 1, the main bearing selecting robot 52 comprises an arm 602 extending in the Y-axis direction and having opposite ends supported by respective legs or posts 600a, 600b, an arm 604 extending in the X-axis direction and movable along the arm 602 in the Y-axis direction, and a movable unit 606 movable along the arm 604 in the X-axis direction. The movable unit 606 is movable in a space above the support table 54, and will not be described in detail as it is of the same structure as that of the main assembly of the connecting rod bearing selecting robot 42.

The main bearing installing robot 6 comprises the arm 602 shared by the main bearing selecting robot 52, an arm 608 extending in the X-axis direction and movable along the arm 602 in the Y-axis direction, and a movable unit 610 movable along the arm 608 in the X-axis direction and also movable in the Z-axis direction. The movable unit 610 is movable between the jig device 58 and the roller conveyor 36. The movable unit 610 is of the same structure as that of the movable unit 126 of the connecting rod bearing installing robot 60, and hence will not be described in detail.

Operation of the installing apparatus of the present invention will be described below.

A cylinder block 20 with connecting rods 14 disposed in the cylinders 20b, connecting rod caps 16, bearing caps 22, and a crankshaft 28 are placed in respective locations on a workpiece transfer table 38. The connecting rod caps 16, the cylinder block 20, and the crankshaft 28 bear, in respective positions thereon, pre- measured dimensional data of portions where bearings are to be mounted, the dimensional data being noted in the form of a bar code of imprinted marks. The workpiece transfer table 30 with such workpieces W placed thereon is first conveyed by the roller conveyor 36 to the working position in the data readout robot 40.

Figure 6:
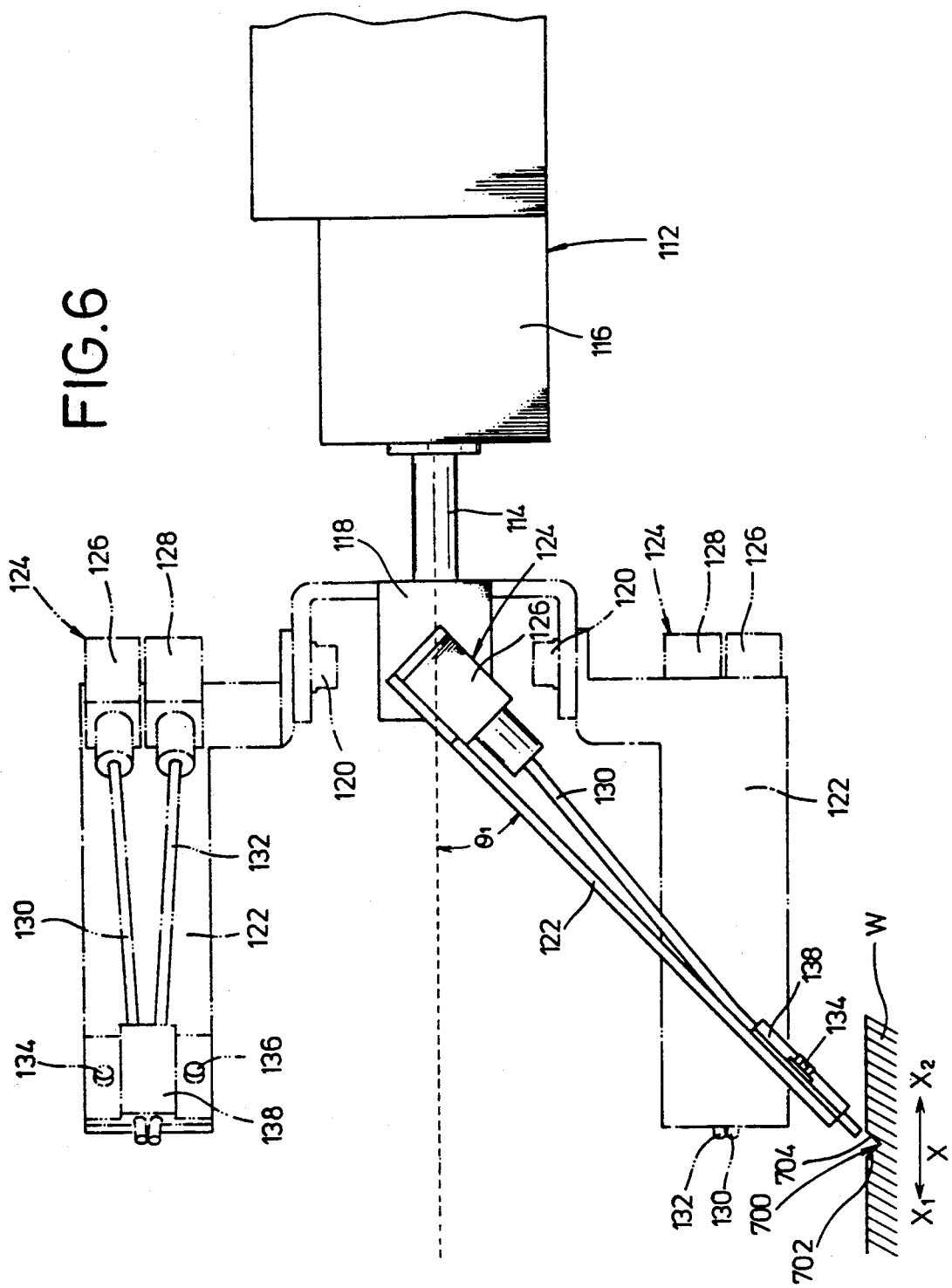
FIG. 6 is an elevational view showing the manner in which the Z-axis movable unit of FIG. 5 operates.
Figure 7:
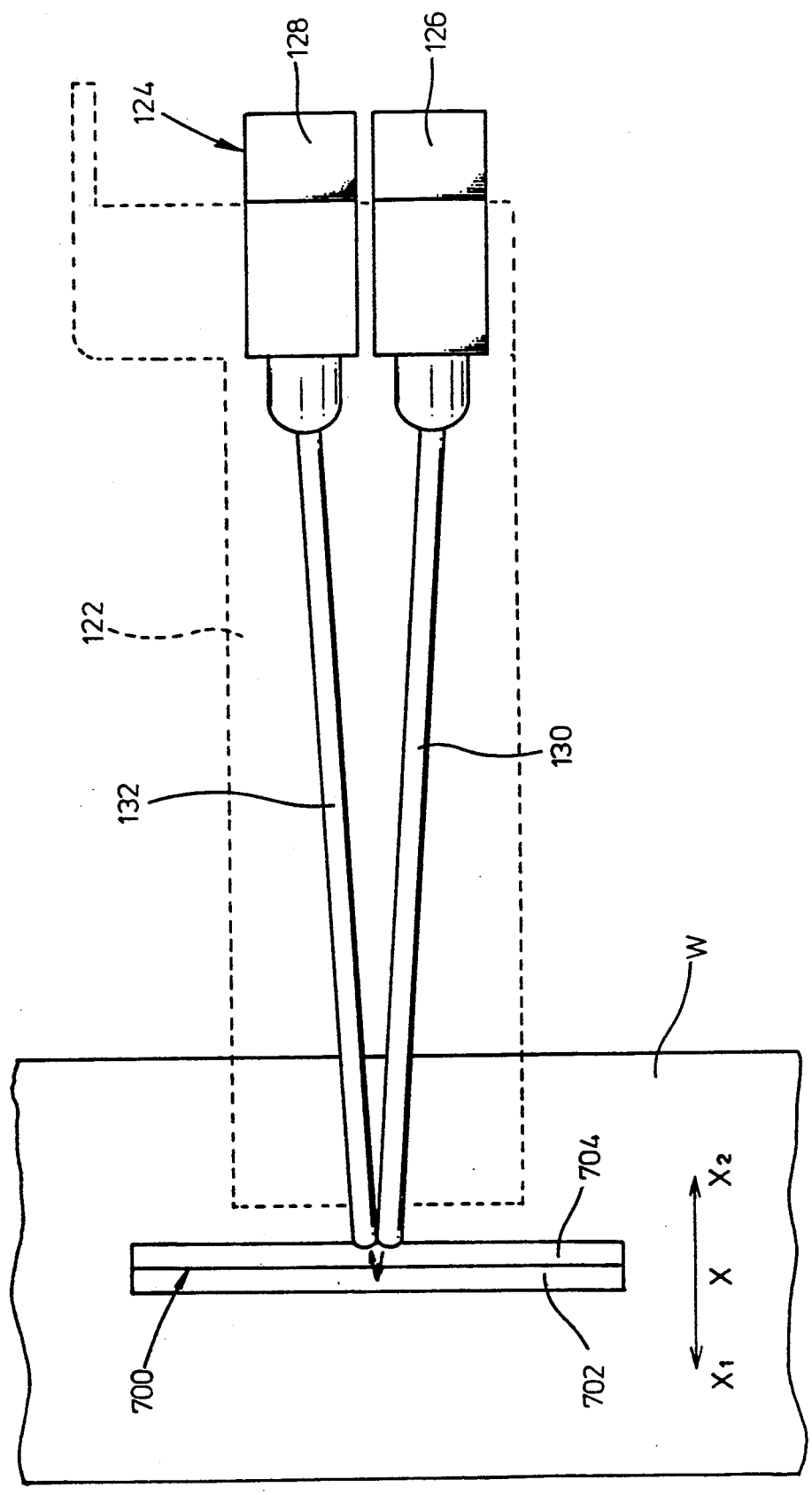
FIG. 7 is a plan view of a tip end portion of the Z-axis movable unit shown in FIGS. 5 and 6 and a bar code imprinted on a workpiece, the view illustrating how the bar code is read.
Figure 19:
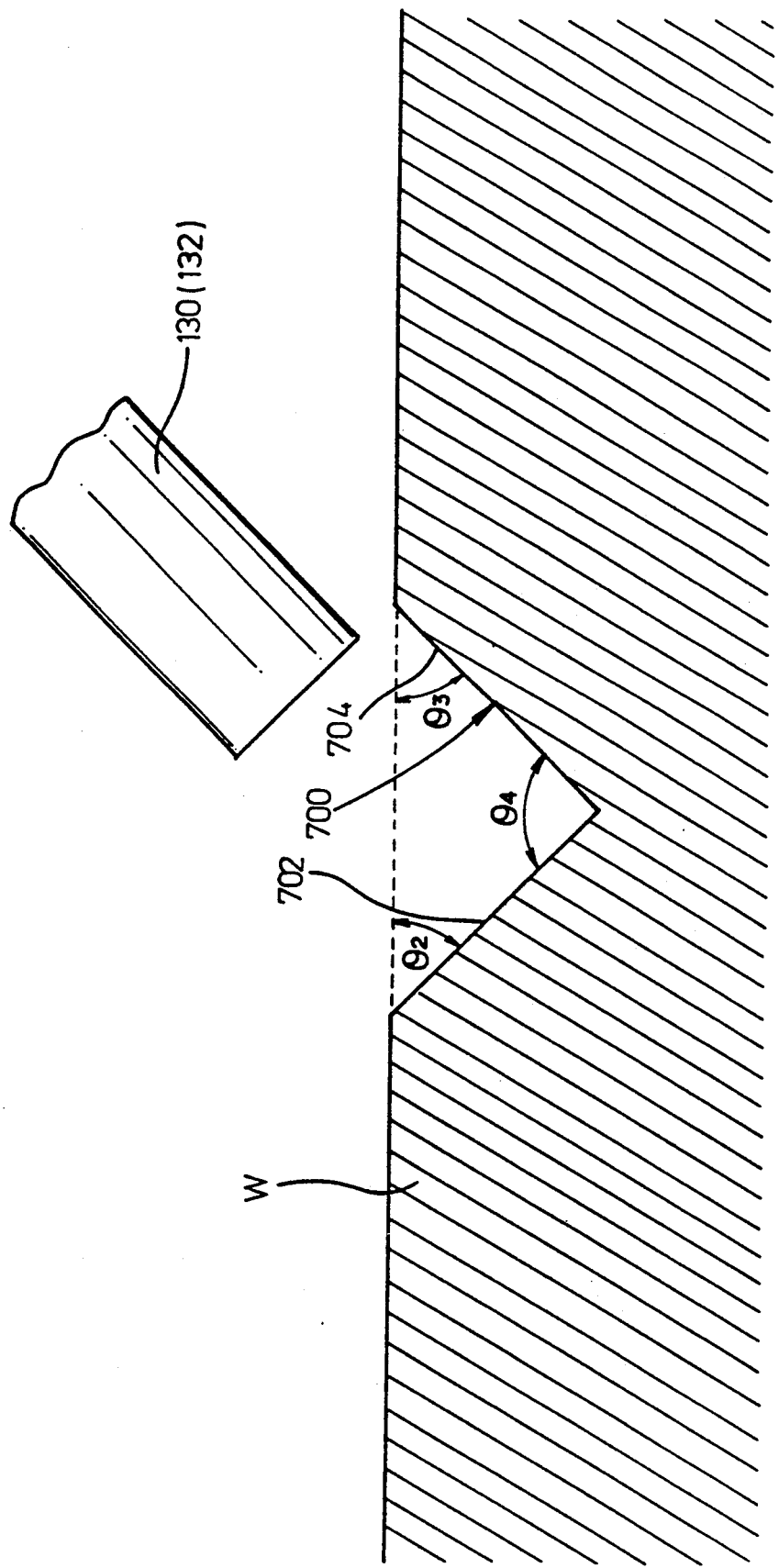
FIG. 19 is a fragmentary view showing the manner in which bar code data imprinted on a workpiece is read by an optical fiber of the data readout robot.

One example of an impressed mark that will be read by the data readout robot 40 is as follows:

As shown in FIGS. 6 and 7, an imprinted mark 700 on a workpiece W is a recess in the form of a straight V groove. As shown in FIG. 19 at an enlarged scale, the imprinted mark 700 is defined by slanted surfaces 702, 704 inclined at $\theta 2$, $\theta 3$ to the extension of the flat surface of the workpiece W, $\theta 2$, $\theta 3$ being equally 45°. The angle $\theta 4$ formed between the slanted surfaces 702, 704 is 90°. Therefore, the recess of the imprinted mark 700 has a cross section shaped as a rectangular equilateral triangle. The imprinted mark 700 serves as a bar code impressed on the workpiece. In practice, a certain number of parallel imprinted marks 700 are impressed as a bar code on a workpiece according to its type, and the data of the workpiece can be identified by detecting the number of imprinted marks 700 with the data readout robot 40. The process of reading the imprinted mark on the workpiece W will be described below.

The Z-axis movable unit 112 is moved to a desired position and at the same time the swing drive mechanism 116 is driven to turn the swing shaft 114 through a desired angle. The position of the movable unit 112 and the angle through which the swing shaft 114 is rotated are appropriately selected to move the distal end of the beam sensor 124 in close proximity with the printed mark 700. As shown in FIG. 6, if the surface of the workpiece W lies parallel to the axis of the swing shaft 114 and the direction in which the imprinted mark 700 extends is normal to the axis of the swing shaft 114, then the optical fibers 130, 132 of the beam sensor 124 are directed perpendicularly to the slanted surface 702. With the swing drive mechanism 116 controlled to position the beam sensor 124 as described above, therefore, a light beam emitted by the light-emitting element 126 and applied from the optical fiber 130 to the imprinted mark 700 is reflected by the slanted surface 702 back into the optical fiber 132 and then detected by the light detector 128. Therefore, the beam sensor 124 can detect the imprinted mark 700. In an actual process, the bar code area of the workpiece is scanned by the light beam emitted by the light-emitting element 126 and the reflected light beam is detected by the light detector 128 to read different bar code data. Where the bar code is composed of the imprinted mark 700, it is scanned by the light beam in the direction of the arrow X1 or X2 to read the bar code data. For effecting such scanning, the Y-axis movable unit 104 may be moved along the Y-axis arm 100 with respect to the workpiece W which is held stationary, or the workpiece W may be moved in the direction of the arrow X1 or X2 while the beam sensor 124 remains fixed. The bar code in the form of the imprinted mark 700 is read out in the manner described above.

Figure 20:
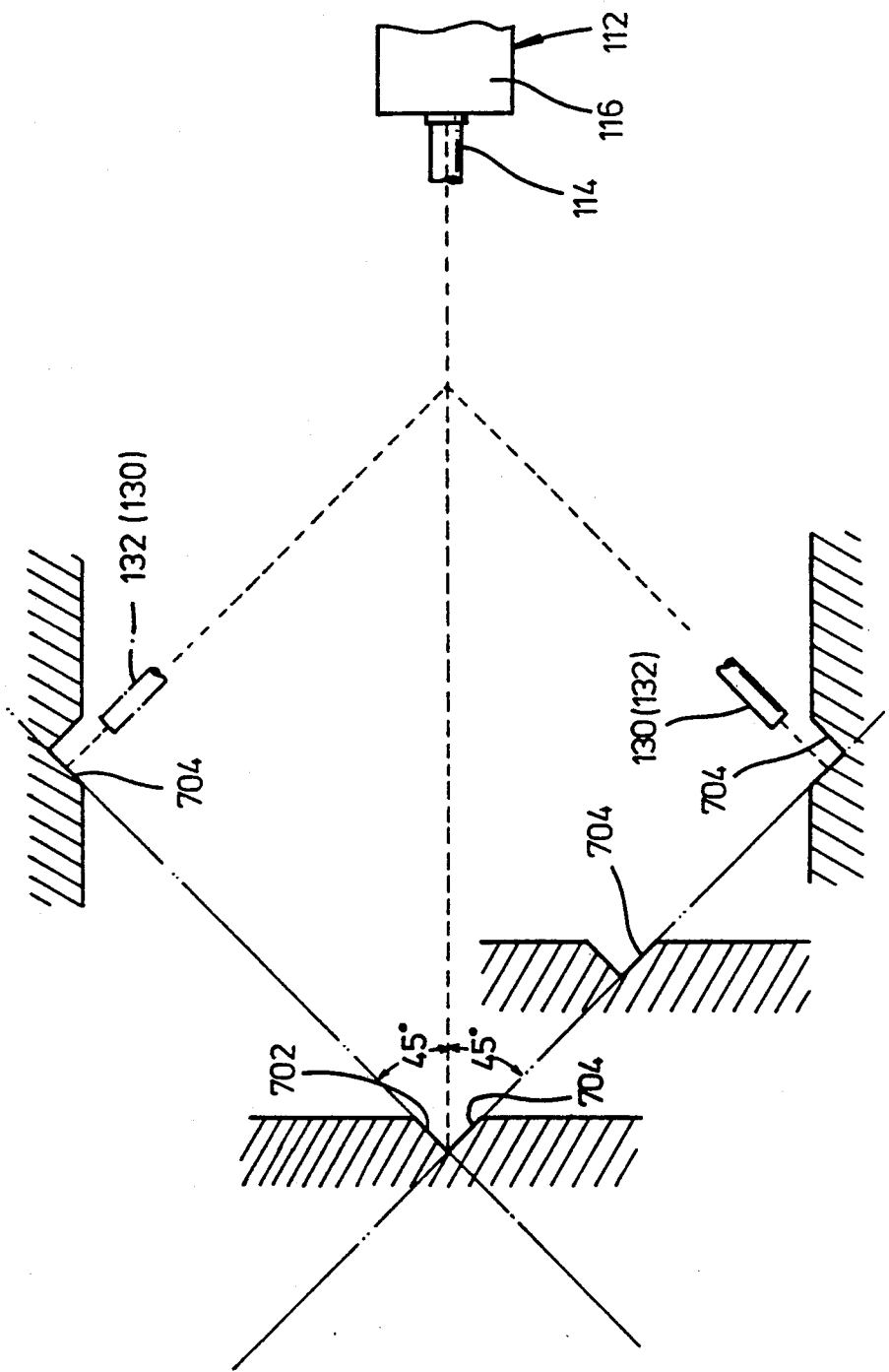
FIG. 20 is a plan view, partly shown in cross section, showing the manner in which workpiece imprints are read by the data readout robot.

While the workpiece W is moving along the transfer path, the beam sensor 124 can be moved in any direction without driving the data readout robot 400 to change its position, so that the bar code can be read accurately by the beam sensor 124 irrespective of the direction of movement of the workpiece W. Since the beam sensor 124 can be angularly moved as desired by the swing drive mechanism 116, it can apply a light beam at an appropriate angle to differently angled surfaces of imprinted marks. As shown in FIG. 20, any surfaces of imprinted marks which lie at 45° with respect to the axis of the swing shaft 114 are held in perpendicular relation to the beam sensor 124. Therefore, if it is possible to imprint a bar code on a workpiece surface lying parallel or perpendicular to the axis of the swing shaft 114, then the beam sensor 124 can be used with optimum readout efficiency. Stated otherwise, if the slanted surface 702 or 704 of the imprinted mark 700 lies in perpendicular relation to the light beam emitted by the beam sensor 124, the bar code can be read most efficiently. However, it will be understood that the beam sensor 124 can read bar codes imprinted on various different workpiece surfaces since the beam sensor 124 can be controlled to emit the light beam at different angles to the workpieces and can be moved as desired by the data readout robot 40 which is movable in the Cartesian coordinate system.

Consequently, the data of various engine components can easily and simply be discriminated by the bar code data readout robot 40. For example, engine components such as crankshafts, cylinder blocks, and the like are imprinted with bar codes, and the imprinted bar codes are read by the bar code data readout robot 40 for facilitating a procedure to select various bearings which match such crankshafts, cylinder blocks, and other engine components.

Figures 21A, 21B, 21C, 21D:
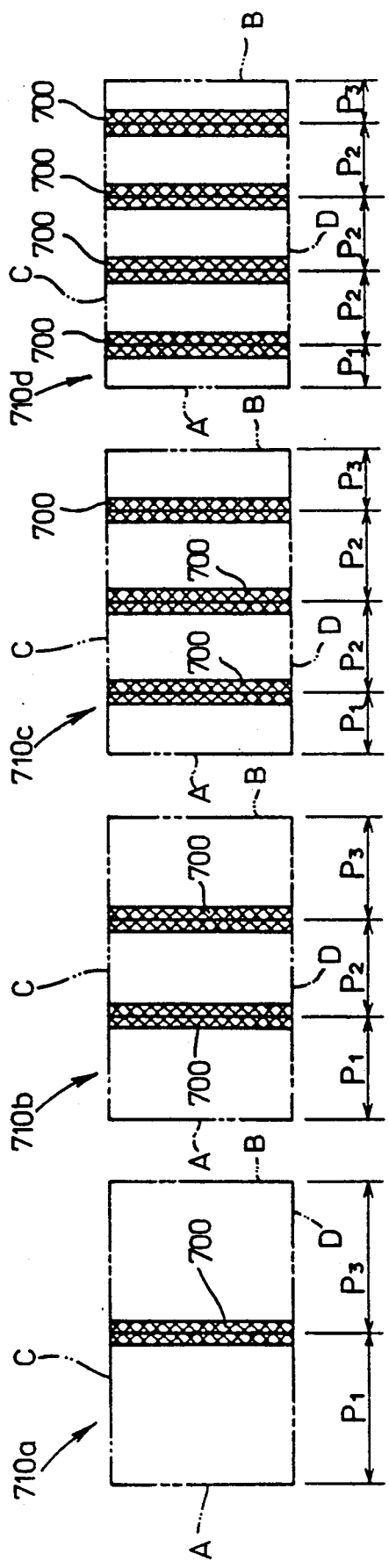
FIG. 21a–21d are views of workpiece bar codes to be read by the data readout robot.
Figure 22:
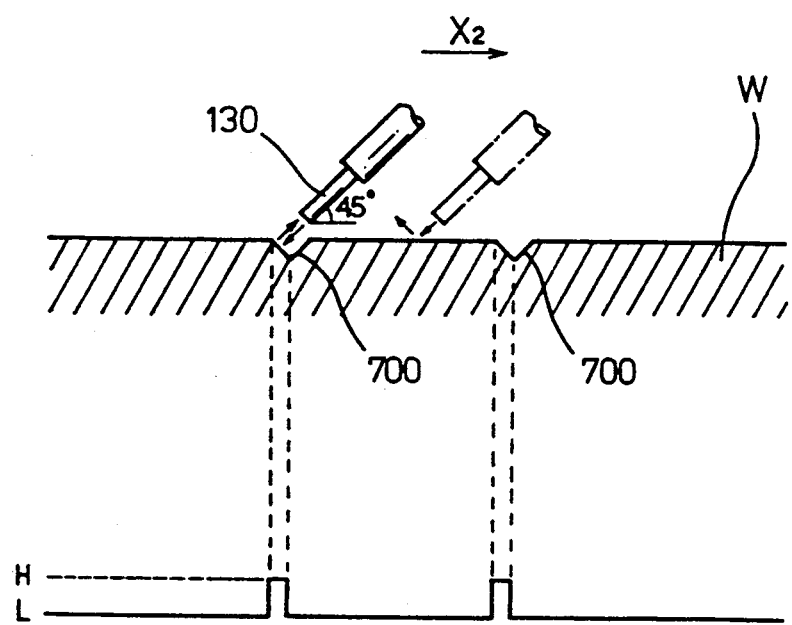
FIG. 22 is a view showing the relationship between a bar code imprinted on a workpiece and pulses produced by the data readout robot when it reads the bar code.

Examples of bar codes that can be read by the data readout robot 40 for discriminating the types of workpieces W are as follows: FIG. 21 show various bar code data 710a through 710d which are indicated as one or more imprinted marks 700 impressed in certain areas on workpieces W that are surrounded by imaginary lines A through D. The bar code data 710a through 710d are therefore given as four different data composed of different numbers of imprinted marks. The imprinted marks 700 of the bar code data 710a through 710d extend between the lines C and D and are spaced at intervals P1, P2, P3 between the lines A and B. The intervals P1, P3 are defined between an imprinted mark and a side of the area in which the imprinted mark is present, and the interval P2 is defined between adjacent imprinted marks. For example, the bar code data 710a comprises one imprinted mark 700, and hence the interval P2 is nil. The bar code data 710a through 710d are read by the beam sensor 124. The light beam emitted by the light-emitting element 126 is applied via the optical fiber 130 to the imprinted V-groove mark 700 on the workpiece W, and the reflected light beam from the mark 700 is transmitted through the optical fiber 132 to the light detector 128. When the reflected light beam is detected by the light detector 128, the beam sensor 124 issues a high-level pulse signal to a control circuit (described later). When no reflected light beam is detected by the light detector 128, the pulse signal generated by the beam sensor 124 goes low in level. The relationship between the position of the beam sensor 124 with respect to the workpiece W and the pulse signal is shown in FIG. 22.

Figure 23:
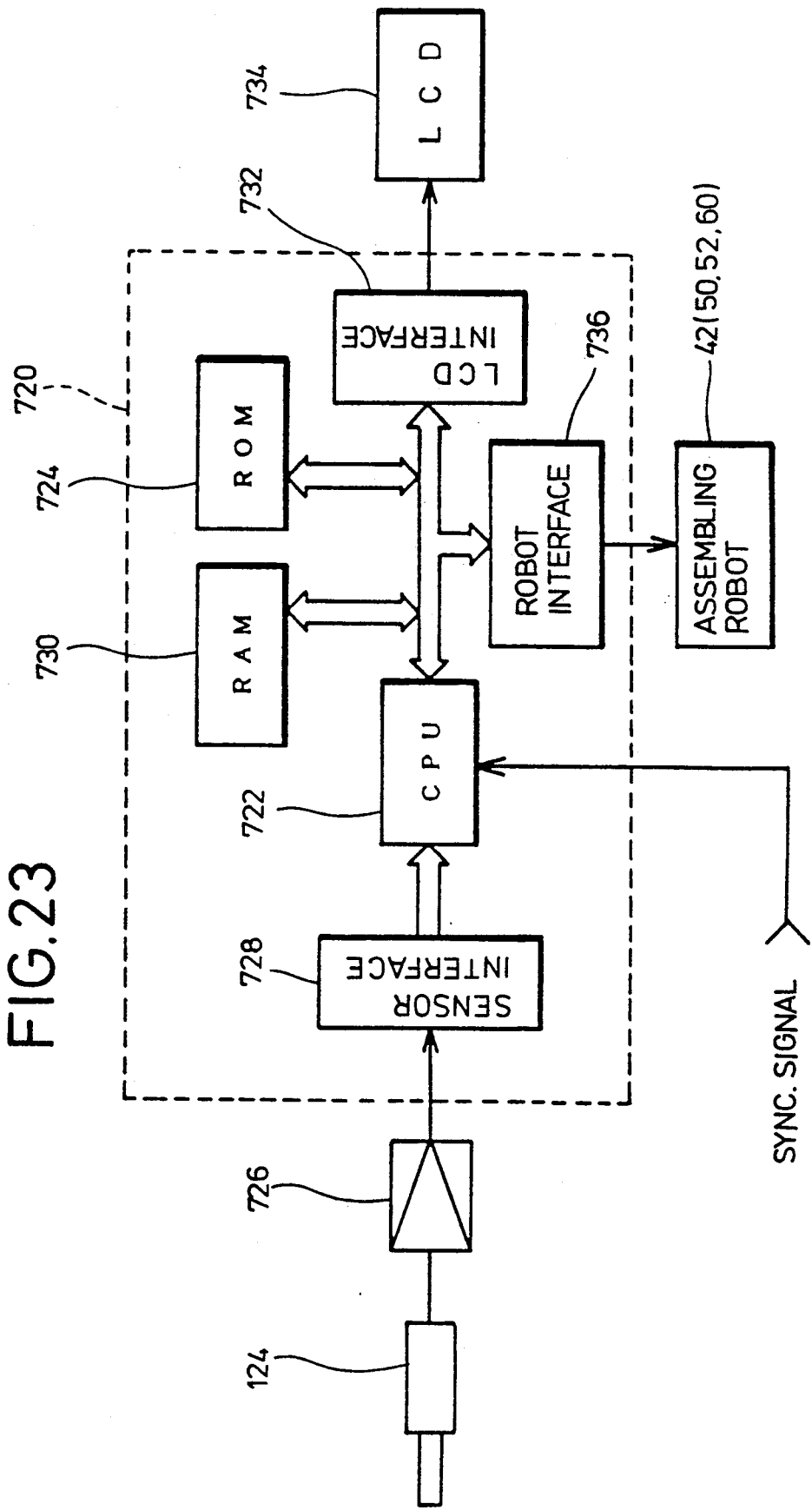
FIG. 23 is a block diagram of a control system for the data readout robot.
Figure 24:
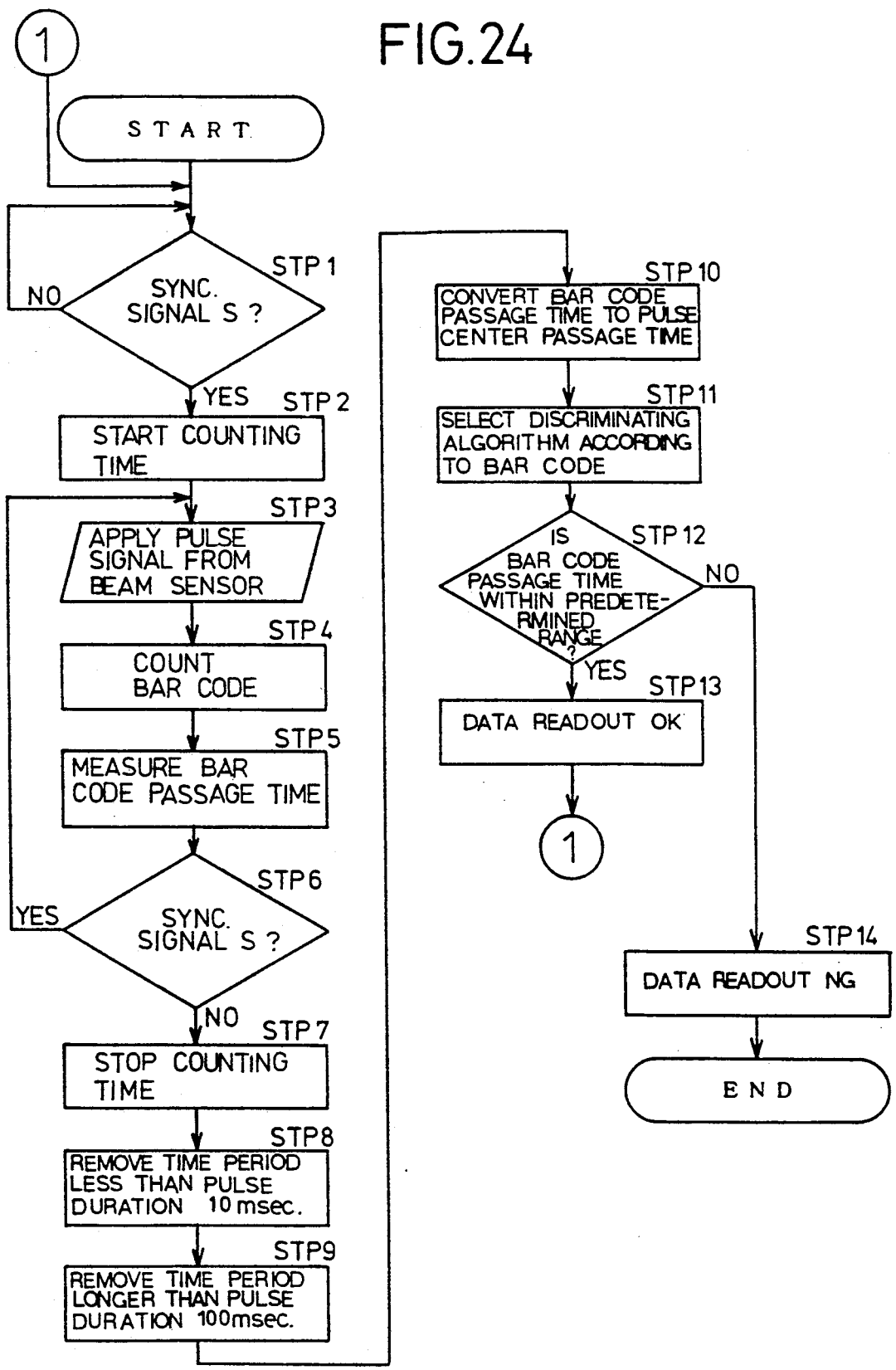
FIG. 24 is a flowchart of an operation sequence of the control system illustrated in FIG. 23.

FIG. 23 shows a control circuit for electrically processing signals produced as the bar code data 710a through 710d. The beam sensor 124 moves to the line A of any of the bar code data 710a through 710d on the workpiece W. When the beam sensor 124 reaches the line A, a high-level synchronizing signal S is applied to a CPU 722 of a microcomputer 720 serving as the control circuit of the data readout robot 40 (step 1 in FIG. 24).

Figure 25:
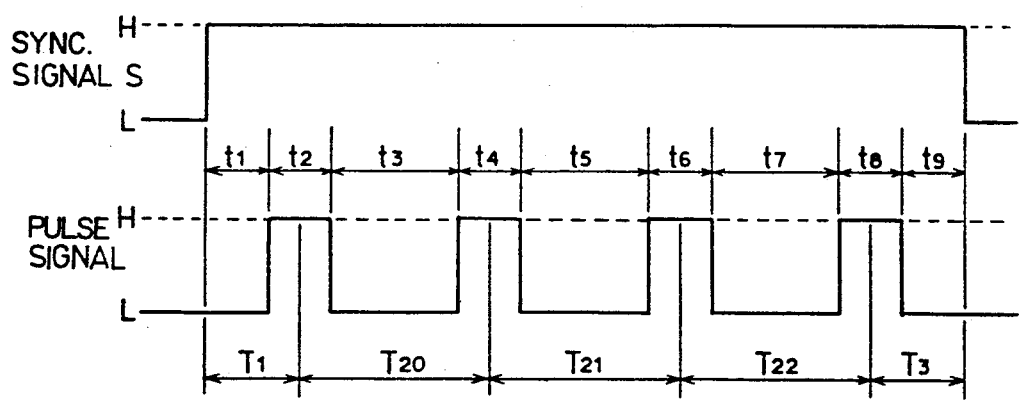
FIG. 25 is a timing chart of an output signal produced by the control system shown in FIG. 23.
Figure 26A:
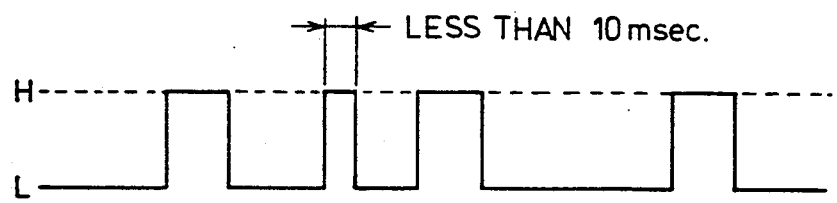
FIGS. 26a and 26b are timing charts of a pulse signal from a beam sensor, detected by the data readout robot in the installing apparatus, and a pulse signal which is generated by correcting the beam sensor pulse signal.
Figure 26B:
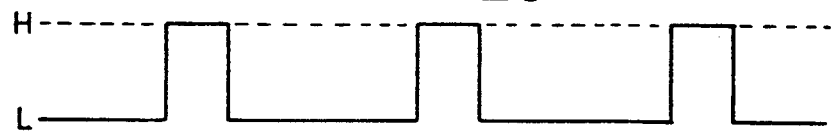
Figure 27A:
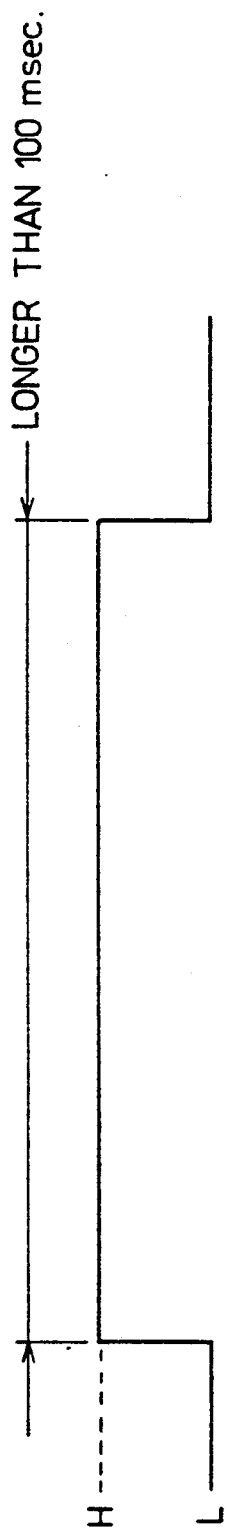
FIGS. 27a and 27b are timing charts of a pulse signal from the beam sensor, detected by the data readout robot in the installing apparatus, and a corrected pulse signal.
Figure 27B:
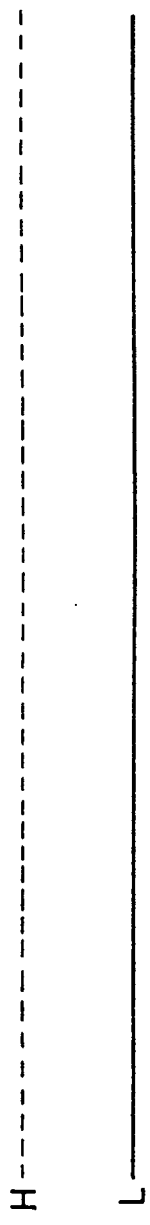

In response to the synchronizing signal S, the CPU 722 starts counting a time period with an inner timer (not shown) therein at a step 2. The CPU 722 effects its control sequence according to a program stored in a ROM 724. At the same time that the synchronizinng signal S is issued, the beam sensor 124 is moved from the line A to the line D. When the beam sensor 124 reaches the imprinted mark 700, it applies a high-level pulse signal (FIG. 22) to a sensor amplifier 726, which amplifies the pulse signal and applies the same via a sensor interface 728 to the CPU 722 at a step 3. The CPU 722 counts the number of imprinted marks 700 in response to pulse signals each produced when the beam sensor 124 passes over one imprinted mark 700 (step 4), and measures the time in which the beam sensor 124 passes over the imprinted marks 700 (step 5). The steps 4 and 5 are repeated until the beam sensor 124 reaches the line D, whereupon the synchronizing signal S goes low (step 6). The number of imprinted marks 700 is incremented in response to the positive-going edge of a pulse signal produced each time the beam sensor 124 goes across an imprinted mark 700, and is stored in a given register. As shown in FIG. 25, the time in which the beam sensor 124 goes across imprinted marks, i.e., the bar code passage time, is measured by counting, with the inner timer, a time interval t1 from the positive-going edge of the sychronizing signal S to the positive-going edge of a first pulse signal, time intervals t2, t4, t6, t8 from the positive- to negative-going edges of the pulse signals, time intervals t3, t5, t7 from the negative-to positive-going edges between the adjacent pulse signals, and a time interval t9 from the negative-going edge of the final pulse signal to the negative-going edge of the synchronizing signal S. These time intervals are stored in given registers. The timing chart of FIG. 25 is indicative of these time intervals measured when the bar code data 710d is read by the beam sensor 124. When the synchronizing signal S goes low (step 6), the CPU 722 stops its time counting operation (step 7). Then, the CPU 722 compares those of the time intervals t1 through t9 stored in the respective registers in which the pulse signals are high in level with a preset pulse duration of 10 msec. (FIG. 26a) which is stored in a RAM 730, and removes those less than 10 msec. as noise as shown in FIG. 26b (step 8). At this time, the number of the removed pulse signals is subtracted from the number of the imprinted marks 700 which have been counted in the step 4. In addition, those of the pulse signals which have a pulse duration longer than 100 msec. (FIG. 27a) are also removed as shown in FIG. 27b (step 9) by interpreting the imprinted mark 700 as being damaged. The number of the pulse signals thus removed is also subtracted from the number of the imprinted marks 700 which have been counted in the step 4.

Thereafter, the time intervals t1 through t9 are converted to times T1, T20, T21, T22, T3 between the centers of the adjacent pulse signals and between the lines A, B and the centers of first and final pulse signals in a step 10. For example, T1 can be given by:

$$T1 = t1 + (t2/2)$$

The other times T20, T21, T22, T3 can similarly be determined. These times are stored in respective given registers. This time conversion is effective in averaging any errors of the imprinted marks 700 on the workpiece W thereby to provide stable data.

Figure 28:
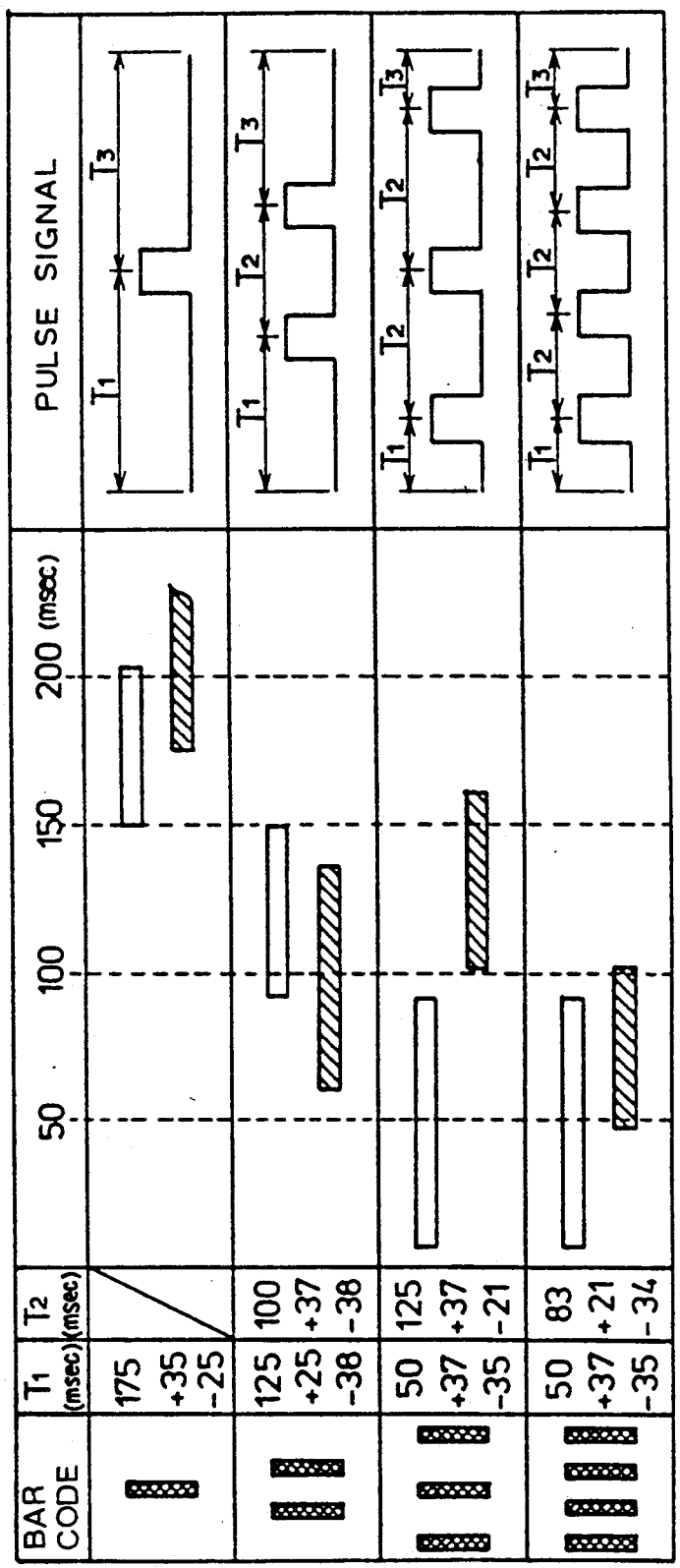
FIG. 28 is a table showing a discriminating algorithm employed when the data readout robot reads bar code data.

One of discriminating algorithms which are stored in the RAM 730 is selected in a step 11 according to the number of the imprinted marks 700 which have been counted in the step 4. These stored discriminating algorithms are prepared to establish, for the respective bar code data 710a through 710d, allowable ranges for the time T1 required for the beam sensor 124 to produce a first pulse signal after the positive-going edge of the synchronizing signal S, and the times T20, T21, T22 (hereinafter referred collectively as "T2") required for the beam sensor 124 to read the successive imprinted marks 700. Such discriminating algorithms are shown by way of example in FIG. 28. In FIG. 28, the time T1 is indicated as a white bar range, and the time T2 is indicated as a shaded bar range. The selected discriminating algorithm determines whether the times T1, T2 for the bar code data detected by the beam sensor 124 are within the allowable ranges in a step 12. If there are four imprinted marks 700, for example, the allowable range for the time T1 is from 15 msec. to 80 msec. and the allowable range for the time T2 is from 49 msec. to 104 msec. If the times T1, T2 are within the allowable ranges, then the bar code 700 is determined as being correctly read in a step 13, and the number of the imprinted marks 700 or a product number corresponding to the number of the imprinted marks 700 is displayed through an LCD interface 732 on a liquid crystal display 734. If the times T1, T2 are not within the allowable ranges, then the bar code 700 is interpreted as being subjected to a readout failure, and an alarm is displayed on the liquid crystal display 734. Therefore, when the bar code data 710a through 710d are read correctly, they are displayed on the liquid crystal display 734. At the same time, the CPU 722 operates, through a robot interface 736, the connecting rod bearing selecting robot 42, the connecting rod bearing selecting robot 50, the main bearing selecting robot 52, and the main bearing installing robot 60 for installing those bearings which match the bar code data 710a through 710d at prescribed locations in the cylinder block or other parts.

The connecting rod bearing selecting robot 42 operates as follows:

The movable unit 206 is moved along the arms 202, 204 to the stocker 46 in which a number of workpieces W or connecting rod bearings are closely stored. Workpieces W1, W2 of these workpieces W are simultaneously picked up, and placed on the workpiece rests 284 of the jig device 48. This process will be described in detail below.

Figure 30:
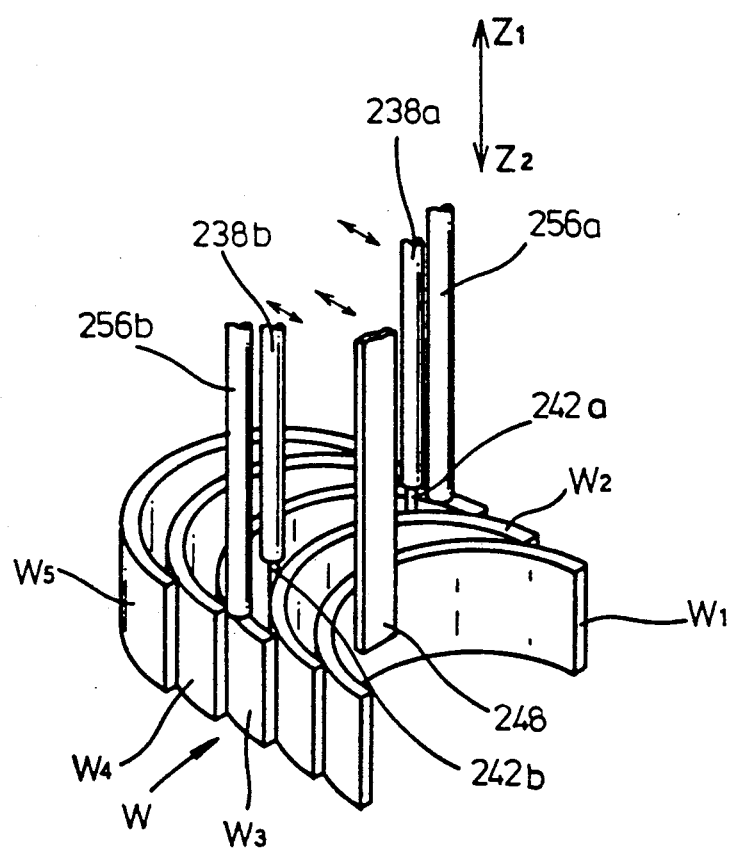
FIG. 30 is a perspective view showing the manner in which the connecting rod bearing selecting robot and the main bearing selecting robot grip the workpiece.

The movable unit 206 is driven to move the gripper mechanism 208 downwardly in the Z-axis direction to put the strip 248 into the space defined by the inner peripheral space of the workpiece W and also to put the fingers 242a, 242b into the space defined between the workpieces W2, W3. Continued downward movement of the gripper mechanism 208 causes the stoppers 256a, 256b to abut against the upper surface of the workpiece W3 to hold the same immovably (FIG. 30). After the movable unit 206 has been stopped, the cylinder 214 is actuated. At this time, the visual sensor 260 is energized for the worker to be able to understand the positions of the workpieces W1, W2 within the stocker 46 and their shapes. The procedure for enabling the connecting rod bearing selecting robot 42 to firmly hold the workpieces W1, W2 while utilizing the visual sensor 260 will be described below.

Figure 29:
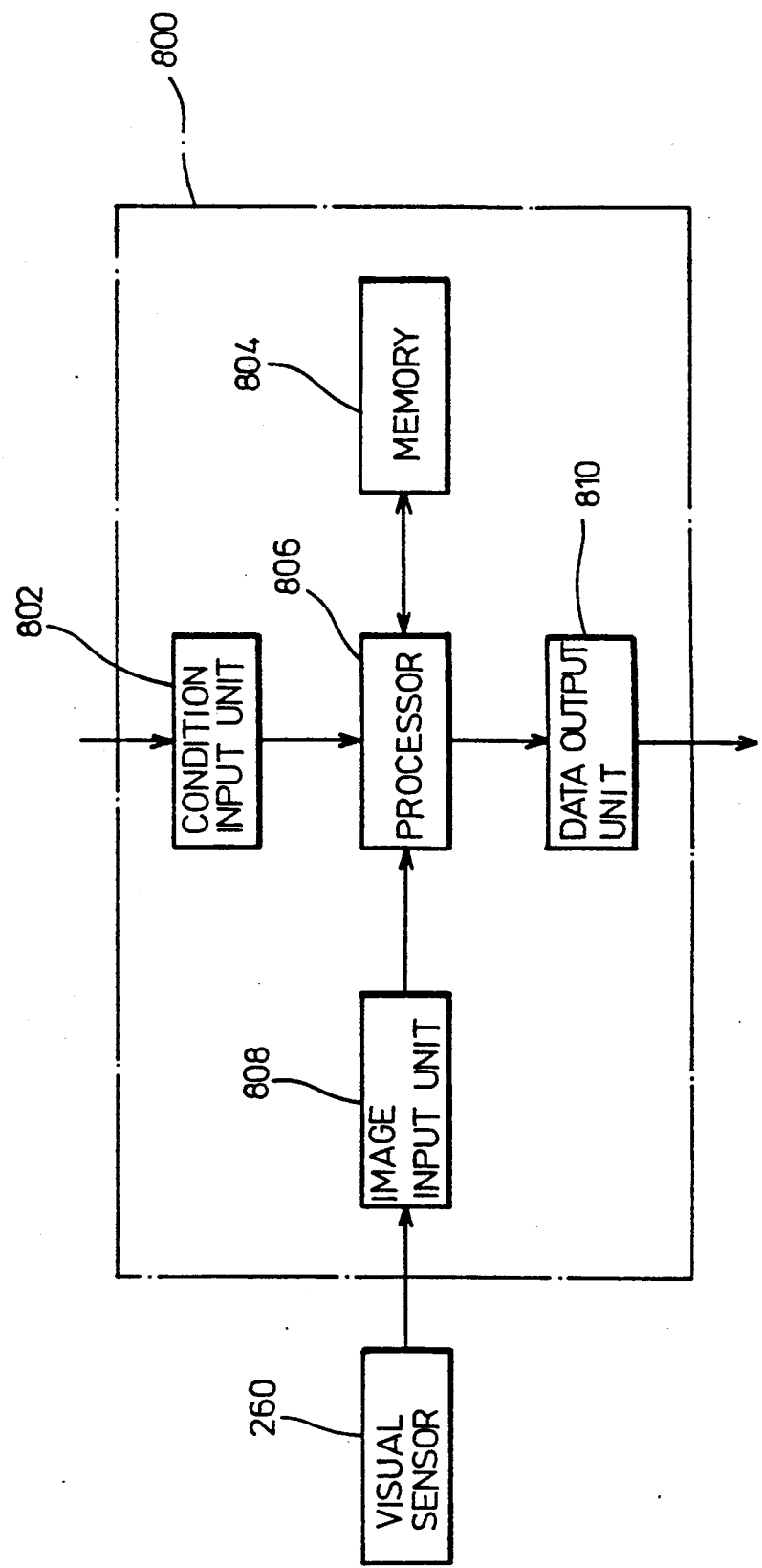
FIG. 29 is a block diagram of a control circuit for correcting the positions of the connecting rod bearing selecting robot and a main bearing selecting robot with respect to a workpiece.
Figure 31:
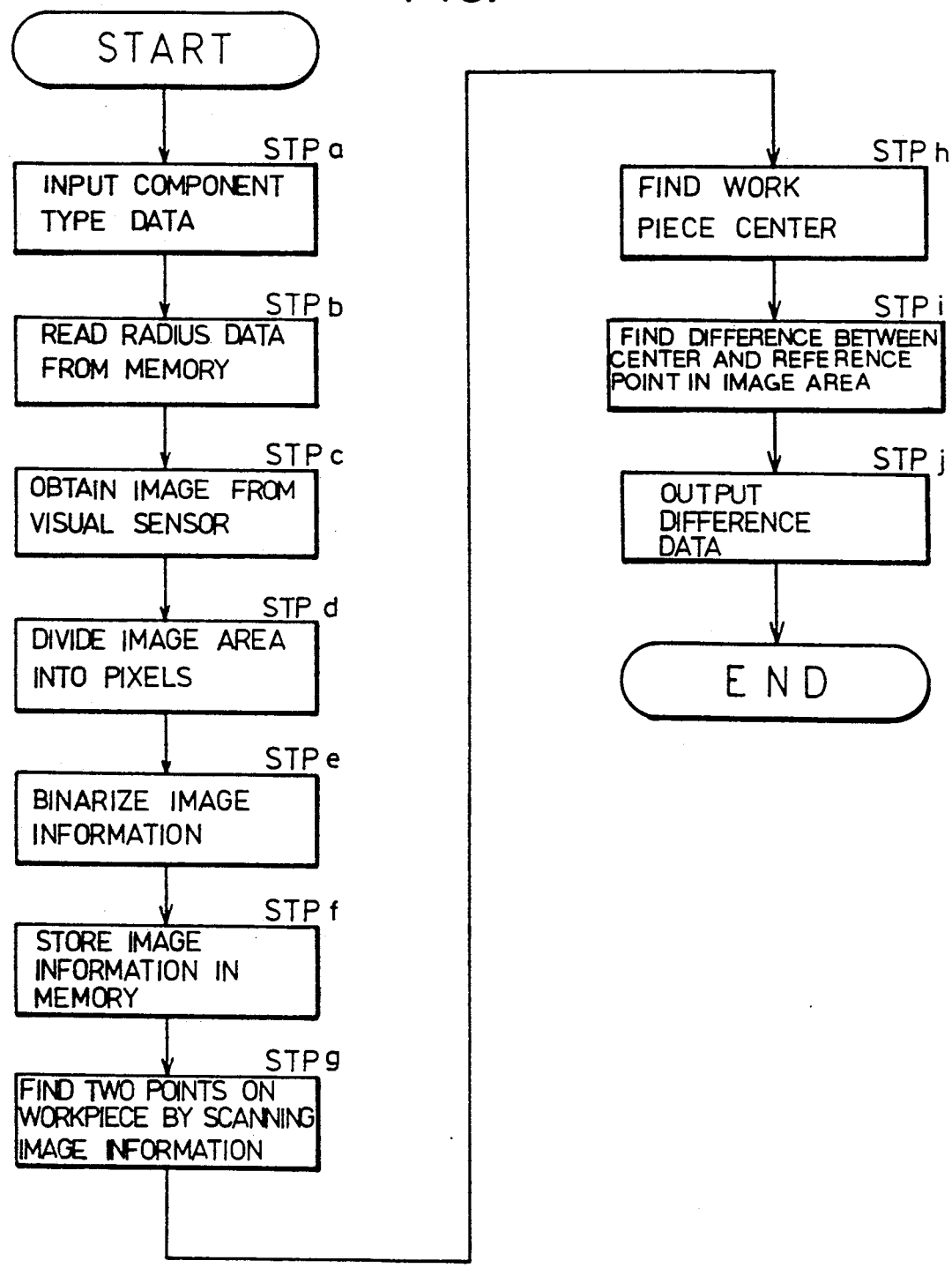
FIG. 31 is a flowchart of an operation sequence of the control system for correcting the positions of the connecting rod bearing selecting robot and the main bearing selecting robot with respect to the workpiece.

The type data of the connecting rod or crankshaft on which bearings are to be installed is entered into a condition input unit 802 (FIG. 29) of a control circuit 800 in a step a (FIG. 31). As illustrated in FIG. 29, the control circuit 800 includes a memory 804 storing radius data of connecting rod bearings 18a, 18b which match various type data of the connecting rods and crankshafts. In response to the type data entered via the condition input unit 802, a processor 806 reads corresponding bearing radius data out of the memory 804 and stores it in a register thereof (step b). Alternatively, radius data may directly be applied from the condition input unit 802 to the processor 806. The movable unit 206 of the connecting rod bearing selecting robot 42 is moved to a desired location in the stocker 46 which stores the bearings 18a, 18b corresponding to the type data.

After the movable unit 206 has been moved, the visual sensor 260 is energized to image an object with the imaging area 262, including the connecting rod bearings 18a, 18b (step c). Image information of the object which has been obtained by the visual sesor 260 is divided by an image input unit 808 into a prescribed number of pixels in a step d. The imaging area 262 of the visual sensor 260 contains the distal ends of the rods 238a, 238b and the strip 238 of the gripper means 240. Since the inner surface of the stocker 46 is lined with a sheet of black flock paper which has a much lower reflectivity than that of the connecting rod bearings 18a, 18b, the pixels corresponding to these bearings can easily be identified by the light reflected from the imaged object. A voltage or current indicative of image information of each pixel is compared with a preset reference level by a comparator or the like. The image information representative of a bearing pixel is converted to a level of 1, whereas the image information representative of a stocker pixel is converted to a level of 0 (step e).

The image information thus binarized is given a pixel address by the processor 806, and then stored in the memory 804 in a step f. Likewise, the image information indicative of the rods 238a, 238b and the strip 248 is also binarized and stored in the memory 804. This image information can however be separated from the image information of the workpieces in the manner described later.

Figure 32:
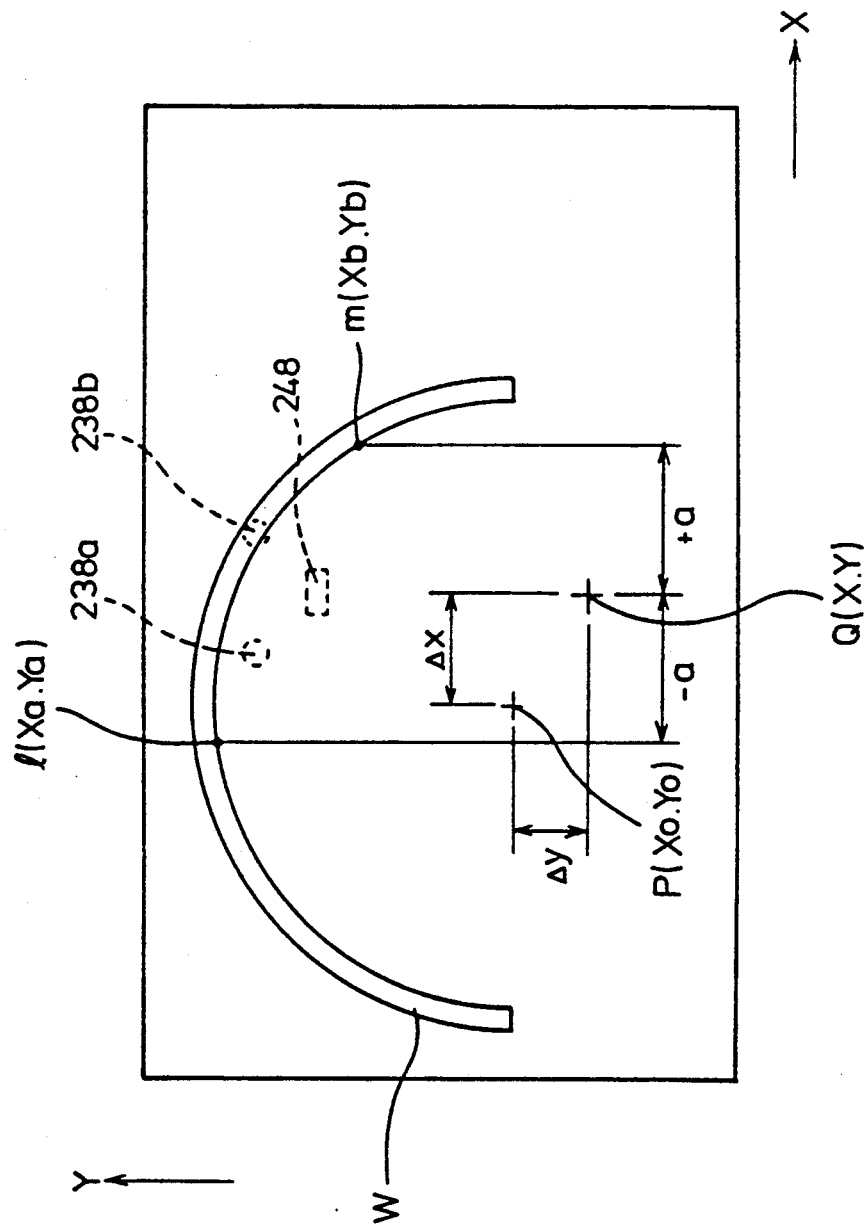
FIG. 32 is a schematic view showing the manner in which the positions of the connecting rod bearing selecting robot and the main bearing selecting robot are corrected with respect to th workpiece.

The positions of the bearings or workpieces W are calculated from the binarized image information. As shown in FIG. 32, if the bearing W has its center P aligned with a preset reference point Q in the imaging area 262, the the bearing W is interpreted as being correctly gripped by the rods 238a, 238b and the strip 248. The reference point Q has a Y coordinate aligned with the Y coordiate of the strip 248. The image information is scanned in the Y-axis direction from a position in the imaging area 262 which is spaced ± a from the reference point Q in the X-axis direction. Two pixels in which the image information is 1 are determined, and regarded as 1, m, respectively, in a step g. Since the scanned pixels are displaced ± a from the reference point Q in the X-axis direction, the rods 238a, 238b and the strip 248 can be removed from the scanned range. Therefore, the pixels in which the image information is 1 as determined in the step g are within the region of the bearing W. A small piece of dust which is smaller than the width of the bearing W may be deposited on the inner surface of the stocker 46. It is preferable in such a case that the points 1, m be on the bearing W in order to avoid any failure to detect the bearing W due to such dust when the image information is scanned. This can be met by detecting whether image information indicating the bearing W is contained in pixels near the points 1, m. In this manner, the reliability of positional correction is increased.

The coordinates of the center P in the imaging area 262 for the bearing W are determined in a step h from the coordinates of the points 1, m and the radius data of the bearing W which is stored in the register. Assuming that the coordinates of the center P are expressed by Xo, Yo, the coordinates of the points 1, m by Xa, Ya, Ib, Xb, and the radius of the bearing W by R, the coordiates Xo, Yo of the center P are given by:

$$Xo = \frac{Xa + Xb}{2} + \sin\left(\tan^{-1}\frac{Yb - Ya}{Xa - Xb}\right) \times \sqrt{R^2 - \frac{(Xa - Xb)^2 + (Ya - Yb)^2}{4}} \quad (1)$$

$$Yo = \frac{Ya + Yb}{2} + \cos\left(\tan^{-1}\frac{Yb - Ya}{Xa - Xb}\right) \times \sqrt{R^2 - \frac{(Xa - Xb)^2 + (Ya - Yb)^2}{4}} \quad (2)$$

Therefore, the differeces Δx, Δy between the coordinates X, Y of the reference point Q and the coordinates Xo, Io of the center P can be derived in a step i from the equations (1) and (2) as follows:

$$\Delta x = Xo - X \quad (3)$$

$$\Delta y = Yo - Y \quad (4)$$

Figure 34:
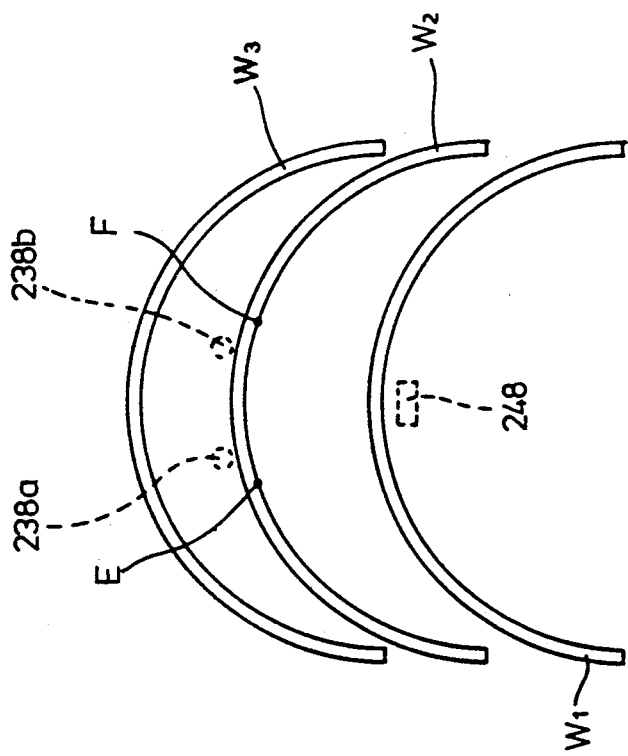
FIGS. 33 and 34 are schematic views illustrating the manner in which the connecting rod bearing selecting robot and the main bearing selecting robot grip workpieces or bearings that are arrayed in a row.
Figure 33:
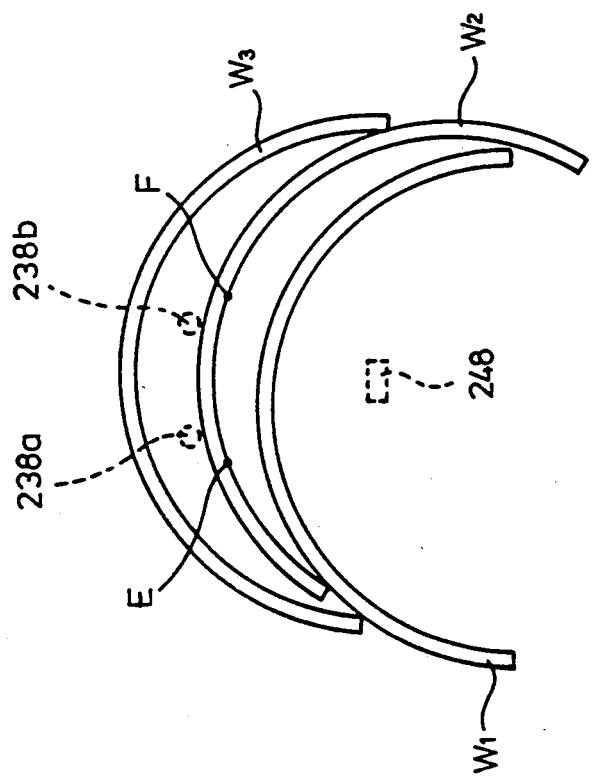

The differences Δx, Δy are applied in a step j through a data output unit 810 to a position control mechanism (not shown) for controlling the connecting rod bearing selecting robot 42. The position control mechanism moves the movable unit 206 based on the difference data Δx, Δy so that the center P is brought to the reference point Q. As a result, the rods 238a, 238b and the strip 248 of the gripper means 240 can be positioned to grip the bearing W correctly. While it has been described as gripping the single bearing W, two out of three bearings W1 through W3 which are closely positioned may simultaneously be gripped as shown in FIGS. 33 and 34. In FIG. 33, one of the two adjacent bearings W1, W2 is inclined to the other with a small distance therebetween, and in FIG. 34, the bearings W1, W2 are relatively spaced apart from each other. If the bearings are positioned as shown in FIGS. 33 and 34, the the bearing W1 closer to the strip 248 is skipped in the scanning process, and two points E, F on the bearing w2 closer to the rods 238a, 238b are scanned and determined in the same manner as the step f of FIG. 31. The gripper means 240 is then positionally corrected on the basis of the coordinates of these points E, F. Therefore, the two bearings W1, W2 even if positioned as shown in FIG. 33 or 34 can simultaneously be gripped by the rods 238a, 238b and the strip 248 without interference between them and the bearings W1 through W3.

Figure 10:
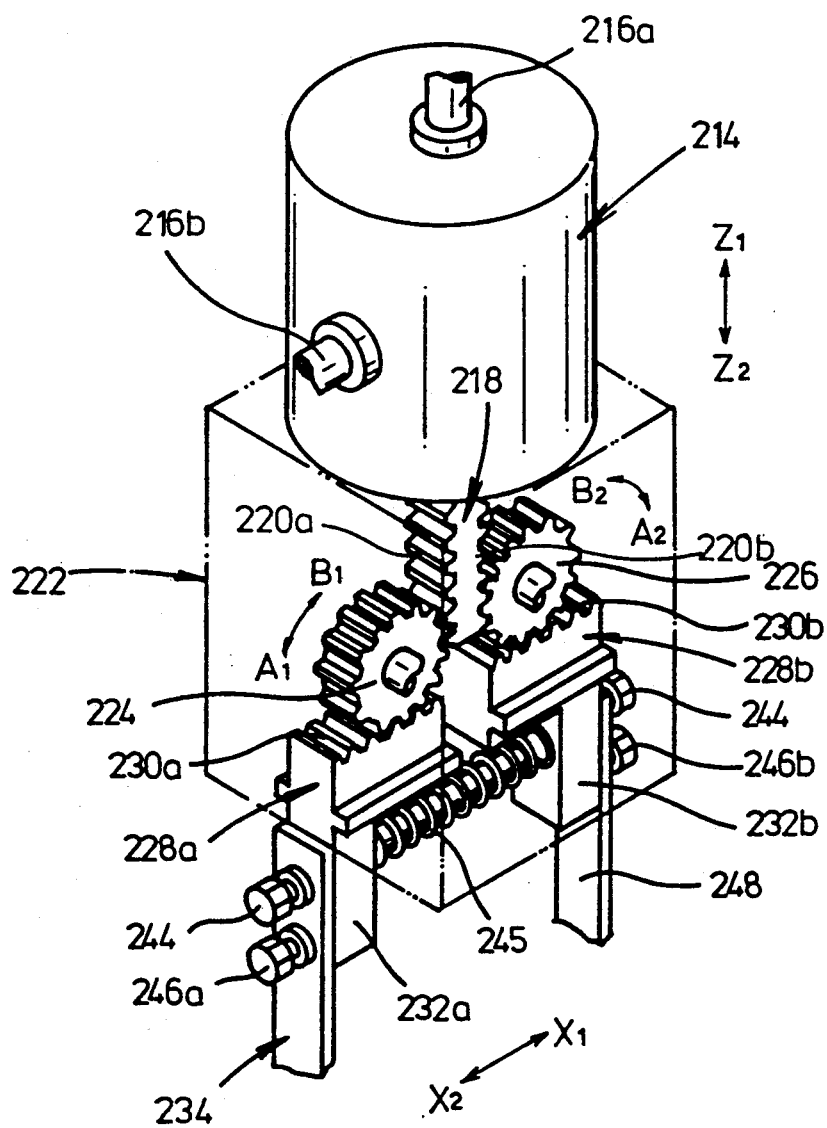
FIG. 10 is a perspective view of a hand of the gripper mechanism shown in FIG. 9.

After the movable unit 206 has thus been positioned, the tube 216a, for example, connected to the cylinder 214 of FIG. 8 is supplied with a working fluid under pressure to displace the piston (not shown) slidably in the cylinder 214, thereby moving the rack 218 connected to the piston rod in the direction of the arrow Z1 (FIG. 10). The pinions 224, 226 meshing with the teeth 220a, 220b of the rack 218 are then rotated about their own axes in the directions of the arrows Al, A2 to move the chucks 224, 226 toward each other in the directions of the arrows X1, X2. Therefore, the support strip 234 and the strip 248 are moved toward each other for thereby bringing the fingers 242a, 242b into contact with the outer peripheral surface of the workpiece W2 and the strip 248 into contact with the inner peripheral surface of the workpiece W1, as shown in FIG. 30.

Then, the cylinder 214 is driven to move the rack 218 further in the direction of the arrow Z1 to enable the fingers 242a, 242b and the strip 248 to grip the workpieces W1, W2. At this time, the attachment bar 232b of the chuck 228a engages the tip end of the stopper bolt 244 to prevent the fingers 242a, 242b and the strip 248 from gripping the workpieces W1, W2 under excessive forces. The resilient forces of the spring 245 also prevents the fingers 242a, 242b and the strip 248 from being displaced quickly into hitting engagement with the workpieces W1, W2, which are therefore protected against falling over or damage. After the workpieces W1, W2 have been gripped by the gripper means 240, the movable unit 206 is driven to move the gripper mechanism 208 upwardly in the direction of the arrow Z1 and also in the X- or Y-axis direction until the gripper mechanism 208 is located over the jig device 48, as shown in FIG. 11.

Then the movable unit 206 is displaced downwardly to place semicircular edges of the workpieces W1, W2 onto the workpiece rest 284. The fluid under pressure is supplied through the tube 216a into the cylinder 214 to displace the rack 218 in the direction of the arrow Z2 (FIG. 10) to rotate the pinions 224, 226 in the directions of the arrows B1, B2, thereby displacing the chucks 228a, 228b away from each other in the directions of the arrows X2, X1. The workpieces W1, W2 are now released from the fingers 242a, 242b and the strip 248 onto the workpiece rest 284.

Thereafter, the movable unit 206 is driven to move the gripper mechanism 208 upwardly in the direction of the arrow Z1, and also in the X-axis direction to position the workpiece tilting mechanism 210 over a position intermediate between the workpieces W1, W2. The cylinder 274 is now driven to displace the piston rod 276 downwardly to lower the conical presser 278 on the lower end of the piston rod 276. The conical outer peripheral surface of the presser 278 is brought into engagement with the workpieces W1, W2 at a position therebetween and pushes the workpieces W1, W2 apart from each other in the directions of the arrows X1, X2 (FIG. 11).

The workpiece W1 falls by gravity off the workpiece rest 284 into the workpiece holder 286 while the workpiece W1 is turned 90°, so that the outer peripheral surface of the workpiece W1 is directed upwardly. Since the slanted portions 290a, 290b of the workpiece holder 286 are inclined inwardly toward each other and the distance between the slanted portions 290a, 290b is substantially the same as the width of the workpiece W1, the workpiece W1 in the workpiece holder 286 can snugly be placed on the support base 288. The workpiece W2 also falls by gravity off the workpiece rest 284 into the workpiece holder 292, in which the inner peripheral surface of the workpiece W2 is directed upwardly.

Then, the movable unit 206 is drive to move the gripper mechanism 208 over the sticker 46, and workpieces W3, W4, for example, are gripped by the gripper mechanism 208 and placed on another workpiece rest 284. Thus, a plurality of workpieces W are placed on the jig device 48 with their outer and inner peripheral surfaces being alternately directed upwardly.

After the workpieces W1 through W4 have been positioned on the jig device 48, the connecting rod bearing installing robot 50 is moved along the arm 300 to a position above the jig device 48, and then the movable unit 304 of the robot 50 is lowered toward the jig device 48. The cylinder 320 is actuated to move the piston rod 324 downwardly in the Z-axis direction for thereby displacing the vertically movable unit 319 on the piston rod 324 downwardly in the Z-axis direction. At this time, since the guide bars 332a, 332b attached to the attachment plate 328 of the unit 319 slide through the cylindrical members 330a, 330b and the attachment plate 318, the unit 319 is prevented from being turned about the piston rod 324. The suction mechanism 322 coupled to the unit 319 is also moved downwardly therewith toward the bearing W2 on the jig device 48. By such downward movement of the suction mechanism 322, the curved surface 380 of the presser 374 is brought into fitting engagement with the inner peripheral surface of the bearing W2. The tip end of the flexible suction cup 386 (FIG. 15) is pressed against the central area of the inner peripheral surface of the bearing W2.

Then, the vacuum pump mechanism coupled to the tube 392 is actuated to develop a vacuum in the tubes 388, 392 and the suction cup 386 to cause the latter to hold the bearing W2. The bearing W2 is therefore attracted by the suction cup 386 while it is being fitted over the curved surface 380 of the presser 374. The cylinder 320 is operated to lift the unit 319 and the suction mechanism 322 in the Z-axis direction. The bearing W2 held by the suction cup 386 in fitting relation to the curved surface 380 is now lifted out of the positioning space 294 of the jig device 48.

As shown in FIG. 2, the connecting rod 14 on which the bearing W2 is to be installed is placed upside down in the cylinder block 20. Therefore, the connecting rod 14 in the cylinder block 20 is generally inclined in abutment against a wall surface of the cylinder block 20. The movable unit 304 is moved in the X- or Y-axis direction to move the suction mechanism 322 holding the bearing W2 to a position over the connecting rod 14 disposed in the cylinder block 20. Then, the suction mechanism 322 is lowered toward the larger-diameter end 14a of the connecting rod 14. Prior to such downward movement of the suction mechanism 322, the bearing W2 and the suction mechanism 322 are tilted together. More specifically, the tilting cylinder 346 is actuated to cause the piston rod 348 to ascend in the Z-axis direction, thus causing the swing plate 356 t turn about the shaft 360. With the piston rod 348 thus displaced upwardly, the presser 374 coupled to the swing plate 356 by the connector 372 and the bearing W2 held on the presser 374 are tilted to a position indicated by the two-dot-and-dash line in FIG. 14. The tilting movement is stopped by engagement of the slanted surface 364 of the swing plate 356 with the head of the stopper pin 368. The locknut 370 is previously loosened and the stopper pin 368 is turned to position the same in the Z-axis direction, so that the angle through which the presser 374 and the bearing W2 are tilted may be equalized to the angle of inclination of a recess defined in the larger-diameter end 14a of the connecting rod 14. Thereafter, the cylinder 320 is actuated to move the piston rod 324 downwardly in the Z-axis direction and the movable unit 304 is moved in the Y-axis direction to displace the bearing W2 tilted as shown in FIG. 14 toward the recess in the larger-diameter end 14a of the connecting rod 14 in the direction of the arrow C (FIG. 14). Continued movement in the direction of the arrow C places the bearing W2 into the recess in the larger-diameter end 14a of the connecting rod 14. Forces are now applied from the movable unit 304 and the cylinder 320 to the bearing W2 through the curved surface 380 of the presser 374 in the direction of the arrow C, with the result that the bearing W2 is forcibly set into the recess in the larger-diameter end 14a of the connecting rod 14. After the bearing W2 has been fitted in the connecting rod 14, the vacuum pump mechanism coupled to the tube 392 is inactivated to release the bearing W2 off the suction cup 386. Then, the unit 319 and the piston rod 329 are displaced to move the suction mechanism 322 in the direction of the arrow D. As a consequence, the suction mechanism 322 is retracted away from the bearing W2 fitted in the larger-diameter end 14a. The procedure for installing the bearing W2 on the connecting rod 14 is now finished.

The unit 319 returns toward the jig device 48, and the second installing mechanism 308 is actuated for picking up the bearing W1 on the jig device 48. More specifically, the cylinder 450 of the cylinder unit 446 of the hand 444 (FIG. 18) is actuated to lower the rack 452 coupled to the piston rod of the cylinder 450. As shown in FIG. 18, the racks 464, 466 to which the gripper fingers 490, 492 are fixed are operatively coupled by the pinions 460, 462 to the rack 462. Therefore, as the rack 452 is lowered, the racks 464, 466 are slid in the Y-axis direction away from each other in and along the groove 480 of the chuck actuator 448 to move the gripper fingers 490, 492 away from each other. The hand 444 is further lowered to position the connecting rod cap 16 between the gripper fingers 490, 492. The connecting rod cap 16 has connecting holes for attaching the connecting rod cap 16 to the larger-diameter end 14a of the connecting rod 14. The positioning pins 500, 502 which are resiliently held on the support 494 by the coil springs 512, 514 are fitted into the connectig holes of the connecting rod cap 16 to position the connecting rod cap 16 with respect to the hand 444. When the connecting rod cap 16 is positioned between the gripper fingers 490, 492, the cylinder 452 is actuated to lift the rack 452 to rotate the pinions 460, 462 in mesh with the teeth 454a, 454b of the rack 452, thereby moving the racks 464, 466 toward each other. Therefore, the connecting rod cap 16 as it is accurately positioned by the positioning pins 500, 502 is gripped between the gripper fingers 490, 492, as shown in FIG. 17.

Then, the connecting rod cap 16 gripped between the gripper fingers 490, 492 is moved to a position over the jig device 48 by upward movement of the hand 44 in the Z-axis direction and movement thereof in the X- and Y-axis directions. The hand 444 is then lowered in the Z-axis direction to bring the connecting rod cap 16 into abutment against the connecting rod bearing 18b (i.e., the workpiece W1) positioned on the jig device 48. On further downward movement of the hand 444, the bearing W1 is fitted in the inner peripheral surface of the connecting rod cap 16. The connecting rod cap 16 with the bearing W1 mounted therein is then moved to the cylinder block 20 with the connecting rod 14 therein by movement of the hand 444 in the X-, Y-, and Z-axis directions. The cylinder block 20 is set on a jig with the cylinder head side down and the larger-diameter end 14a of the connecting rod 14 being oriented upwardly. The semicircular larger-diameter end 14a which the connecting rod cap 16 (workpiece W1) is to engage is normally tilted against a side wall surface of the cylinder block, with a crank pin of the crankshaft fitted in the larger-diameter end 14a through the bearing. Prior to downward movement of the hand 444 in the Z-axis direction, therefore, the hand 444 is operated to tilt the joint surface of the connecting rod cap 16. More specifically, the cylinder 408 is driven to lower or lift the piston rod 410 in the Z-axis direction to turn the swing plate 418 about the shaft 424. The hand 444 coupled to the swing plate 418 is thus angularly moved to either one of the two-dot-and-dash-line positions of FIG. 17, thereby tilting the joint surface of the connecting rod cap 16 gripped by the gripper fingers 490, 492 parallel to the joint surface of the larger-diameter end 14a of the connecting rod 14. The swing plate 418 is prevented from being excessively turned by engagement of the slanted or tapered surface 428a or 428b of the projecting end 426 with the upper end stopper pin 438 on the bracket 430 or the lower end stopper pin 440 on the bracket 432. Any unwanted accident which would arise from excessive tilting of the hand 444 can thus be avoided by the stopper pins 438, 440. The connecting rod cap 16 which is tilted by the cylinder 408 is installed on the larger-diameter end 14a by movement of the hand 444. The larger-diameter end 14a and the connecting rod cap 16 thus assembled together are fastened by bolts.

The workpiece W on which the connecting rod cap 16 has been installed is then transferred by the roller conveyor 36 to the working position in the main bearing installing robot 60. The main bearing selecting robot 52 and the main bearing installing robot 60 operate in the same manner as the connecting rod bearing selecting robot 42 and the connecting rod bearing installing robot 50, as will be described briefly below.

The main bearing selecting robot 52 moves toward the stocker 56 which stores main bearings 24a, 24b which match the dimensional data read by the data readout robot 40. Thereafter, the same gripper mechanism as that of the connecting rod bearing selecting robot 50 is actuated to grip the two main bearings 24a, 24b and carry them to a jig device. The main bearing 24a placed on the jig device is positioned with its convex side down by workpiece tilting means, and the main bearing 24b is positioned with its convex side up by the workpiece tilting means. Then, the main bearing installing robot 60 is moved to the jig device, and the main bearing 24a is held by the same suction mechanism as that of the connecting rod bearing installing robot 50. The main bearing 24a is then fitted in a journal bearing section 20a of the cylinder block 20. Thereafter, the main bearing installing robot 60 grips a bearing cap 22 with its hand and moves therewith. The main bearing installing robot 60 lowers the bearing cap 22 toward the main bearings 24a, 24b, and brings the main bearings 24a, 24b into engagement with the bearing cap 22. The bearing cap 22 with the main bearing 24b installed is placed again on the workpiece transfer table 38.

The workpiece with the connecting rod bearings 18a, 18b and the main bearings 24a, 24b installed thereon is transferred on the workpiece transfer table 38 by the roller conveyor 36 toward the first installing mechanism 12a. The first installing mechanism 12a installs the crankshaft 28 on the cylinder head 22. At this time, the journal 28a of the crankshaft 28 engages the journal bearing section 20a of the cylinder block 20 through the main bearing 20a. The crank pin 28b of the crankshaft 28 engages, through the connecting rod bearing 18a, the larger-diameter end 14a of the connecting rod 14 placed in the cylinder 20b. Then, the thrust washers 30a, 30b are inserted between the opposite ends of the journal bearing section 20a and the journal 28a of the crankshaft 28. The workpiece with the thrust washers 30a, 30b thereon is then fed to the third installing mechanism 12c, in which the oil seals 32a, 32b are fitted over the opposite ends of the crankshaft 28.

Thereafter, the workpiece is delivered to the the fourth installing mechanism 12d, in which the connecting rod cap 16 with the connecting rod cap 18b fitted therein is installed on the larger-diameter end 14a of the connecting rod 14 with the crank pin 28b therebetween. As a result, the piston 26 and the crankshaft 28 are interconnected by the connecting rod 14.

Finally, the fifth installing mechanism 12e installs the bearing cap 22 with the main bearing 24b fitted therein on the journal bearing section 20a of the cylinder block 20 with the journal 28a of the crankshaft 28 therebetween.

According to the present invention, as described above, bearings are automatically installed between a connecting rod and a crankshaft and also between a cylinder block and the crankshaft in an internal combustion engine assembly process, by data readout means for reading dimensional data of the connecting rod, the crankshaft, and the cylinder block, bearing selecting means for selecting bearings based on the dimensional data read by the data readout means and for placing the bearings on a jig device, and bearing installing means for installing the bearings placed on the jig device in prescribed locations on the connecting rod, the crankshaft, and the cylinder block. Therefore, the bearings can automatically and accurately be installed on the engine components without the manual procedure which would be tedious and composed of many steps. The labor involved in the production line for internal combustion engines can be reduced, and assembling errors which would be caused by the worker are also reduced to reduce defective products. The data readout means, the bearing selecting means, and the bearing installing means are independently operable. Consequently, while bearings are being installed on an engine component by the bearing installing means, the data readout means and the bearing selecting means can select bearings for another engine component. The total time required for assembling an engine can be reduced by such simultaneous execution of different assembling steps. In the bar code readout means of the present invention, a beam sensor for reading a bar code is mounted at an angle on a swing shaft, and a swing drive mechanism with such a swing shaft is freely movable by a robot which is operable in the Cartesian coordinate system. Therefore, bar codes impressed on workpiece surfaces which may lie at various angles can reliably be read by the beam sensor, resulting in a higher rate of operation efficiency. Since the robot employed in the bar code readout means is movable along mutually perpendicular axes and structurally simpler than articulated-type robots, they are easily controllable and higher in operation accuracy. Furthermore, because the robot of the invention is less costly than the articulated-type robots, the bar code readout means is inexpensive and practical in use.

A gripper mechanism for gripping a workpiece is comprised of a pair of gripper fingers and a strip disposed in confronting relation thereto, the gripper fingers and the strip being movable toward and away from each other. A workpiece which is located adjacent to another workpiece to be gripped by the gripper mechanism is positioned by presser means. As a consequence, when the workpiece is to be gripped by the gripper mechanism, an adjacent workpiece is not moved by the gripper mechanism. Any desired workpiece or workpieces can accurately be picked out of a group of closely located workpieces. With this arrangement, engine parts such as bearings to be picked up can be stocked as closely as possible in a stacked array, with the consequence that the space available in the engine production factory can efficiently be utilized.

According to the present invention, furthermore, a movable and tiltable suction mechanism is employed to successively hold and transfer bearings and mount them on engine components. More specifically, a bearing placed in a certain location is held by the suction mechanism and transferred to an engine component which is in a spaced position and has an inclined surface on which the bearing is to be installed. The bearing on the suction mechanism can be tilted parallel to the inclined surface of the engine component, and then moved toward the inclined surface so that the bearing can be installed on the inclined surface. Bearings can therefore automatically be installed on engine components without requiring the manual operation which has conventionally been provided by workers. Advantages of the present invention are therefore that the cost of manufacture of internal combustion engines can be reduced and hence inexpensive internal combustion engines can be produced. The installing apparatus of the present invention is inexpensive to construct since it is structurally simple and any device for keeping engine component surfaces on which bearings are to be mounted, in an aligned inclined position is not required because the suction mechanism for holding the bearings is freely tiltable to orient the bearings to meet the engine component surfaces.

Although a certain preferred embodiment has been shown and described, it should be understood that many changes and modifications may be made therein without departing from the scope of the appended claims.

What is claimed is:

1. A method for assembling a bearing including first and second substantially semicylindrically shaped members in an internal combustion engine comprising engine components of connecting rods, connecting rod caps, a crankshaft and cylinder block, said engine components and said first and second substantially semicylindrically shaped members having variable dimensions, comprising the steps of:

reading out dimensional data marked on the engine components wherein a bearing having first and second substantially semicylindrically shaped members are to be installed, wherein said step of reading out dimensional data comprises:

reading data in the form of bar code marks marked on the engine component; providing the bar code marks on the engine component at intervals dependent on the number of the bar code marks; measuring a time interval required from the time to start to read the bar code marks until the first bar code mark is read and a time interval required until adjacent bar code marks are read; and determining whether the number of the bar code marks is correctly read by comparing said time interval with a reference time established according to the number of the bar code marks;

memorizing said dimensional data read out in said reading out step;

selecting said first and second members corresponding to said engine components on the basis of the correctly read bar code marks on the engine component and the memorized dimensional data;

positioning said first substantially semicyclindrically shaped member to be installed in a connecting rod such that a convex side thereof is downwardly oriented, and positioning said second substantially semicylindrically shaped member to be installed in a connecting rod cap such that a convex side thereof is upwardly oriented; and installing said first substantially semicylindrically shaped member on said connecting rod, said connecting rod being assembled together with said cylinder block, such that the convex side of said first substantially semicylindrically shaped member is downwardly positioned on said connecting rod, and installing said second substantially semicylindrically shaped member in said connecting rod cap such that the convex side thereof is upwardly positioned in said connecting rod cap.

2. The method according to claim 1, wherein said reference time has a prescribed allowable range, further including the step of judging said bar code marks by ascertaining whether said time interval is within said allowable range.

3. The method according to claim 1, wherein said positioning step further comprises:

arranging at least said first and second substantially semicylindrically shaped members on a jig device;

tilting said first and second substantially semicylindrically shaped members in mutually different directions so as to be fitted into respective locations on said jig device;

wherein one of said first and second substantially semicylindrically shaped members has said convex side thereof downwardly oriented on said jig device, and another of said first and second substantially semicylindrically shaped members has said convex side thereof upwardly oriented on said jig device.

4. The method according to claim 1, further comprising the step of generating a synchronizing signal upon starting to read the bar code marks; wherein said step of measuring a time interval comprises measuring a time interval between the generation of the synchronizing signal and the reading of the first bar code mark.

5. The method according to claim 1, wherein said step of measuring a time interval further comprises moving an optical sensor at a constant speed over said bar code marks, and detecting said bar code marks based on a change in an amount of light reflected from said bar code marks and detected by said optical sensor.

6. A method for assembling a bearing including first and second substantially semicylindrically shaped members in an internal combustion engine comprising engine components of connecting rods, connecting rod caps, a crankshaft and cylinder block, said engine components and said first and second substantially semicylindrically shaped members having variable dimensions, comprising the steps of:

reading out dimensional data marked on the engine components wherein a bearing having first and second substantially semicylindrically shaped members are to be installed;

memorizing said dimensional data read out in said reading out step;

selecting said first and second substantially semicylindrically shaped members corresponding to said engine components on the basis of the memorized dimensional data, wherein said step of selecting said first and second substantially semicylindrically shaped members comprises:

providing a gripper mechanism displaceable with respect to the first and second substantially semicylindrically shaped members; imaging said first and second substantially semicylindrically shaped members with a visual sensor disposed in a present positional relation to said gripper mechanism; determining the position of said first and second substantially semicylindrically shaped members with respect to a prescribed point in an imaging area of said visual sensor; scanning said imaging area with said visual sensor, thereby determining the positions of two different points on said first and second substantially semicylindrically shaped members with respect to said prescribed point; determining the central position of said first and second substantially semicylindrically shaped members based on said positions of the two points and the radius of said first and second substantially semicylindrically shaped members; correcting the position of said gripper mechanism so that said central position becomes aligned with said prescribed point; and thereafter actuating said gripper mechanism, thereby individually gripping said first and second substantially semicylindrically shaped members;

positioning said first substantially semicylindrically shaped member to be installed in a connecting rod by utilizing said gripper mechanism such that a convex side thereof is downwardly oriented, and positioning said second substantially semicylindrically shaped member to be installed in a connecting rod cap by utilizing said gripper mechanism such that a convex side thereof is upwardly oriented;

installing said first substantially semicylindrically shaped member on said connecting rod by utilizing said gripper mechanism, said connecting rod being assembled together with said cylinder block, such that the convex side of said first substantially semicylindrically shaped member is downwardly positioned on said connecting rod, and installing said second substantially semicylindrically shaped member in said connecting rod cap by utilizing said gripper mechanism such that the convex side thereof is upwardly positioned in said connecting rod cap.

* * * * *